United States Patent
Chu et al.

(10) Patent No.: US 9,734,313 B2
(45) Date of Patent: Aug. 15, 2017

(54) SECURITY MODE PROMPT METHOD AND APPARATUS

(71) Applicant: Huawei Technologies Co., Ltd., Shenzhen (CN)

(72) Inventors: Chengkang Chu, Singapore (SG); Qiang Zheng, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 14/828,919

(22) Filed: Aug. 18, 2015

(65) Prior Publication Data
US 2015/0363584 A1 Dec. 17, 2015

Related U.S. Application Data

(63) Continuation of application No. PCT/CN2015/071428, filed on Jan. 23, 2015.

(30) Foreign Application Priority Data

Jun. 16, 2014 (CN) .......................... 2014 1 0267687

(51) Int. Cl.
*G06F 7/04* (2006.01)
*G06F 21/31* (2013.01)

(52) U.S. Cl.
CPC .................................... *G06F 21/31* (2013.01)

(58) Field of Classification Search
CPC ................................ G06F 21/10; G06F 21/31
USPC ......................................................... 726/28
See application file for complete search history.

(56) References Cited

U.S. PATENT DOCUMENTS

| | | | |
|---|---|---|---|
| 2005/0289353 | A1 | 12/2005 | Dahlke |
| 2008/0072056 | A1 | 3/2008 | Turner |
| 2009/0204823 | A1 | 8/2009 | Giordano et al. |

FOREIGN PATENT DOCUMENTS

| | | |
|---|---|---|
| CN | 101739527 A | 6/2010 |
| CN | 101978377 A | 2/2011 |
| CN | 102567680 A | 7/2012 |
| CN | 102930317 A | 2/2013 |
| EP | 1329787 A2 | 7/2003 |

(Continued)

OTHER PUBLICATIONS

Partial English Translation and Abstract of Chinese Patent Application No. CN101739527, Jul. 30, 2015, 3 pages.

(Continued)

*Primary Examiner* — Anthony Brown
(74) *Attorney, Agent, or Firm* — Conley Rose, P.C.

(57) ABSTRACT

Embodiments of the present disclosure disclose a security mode prompt method and apparatus. The method includes when it is determined that a terminal is currently in a first security mode, acquiring prestored first security information; receiving first verification information entered by a user, and establishing a first correspondence between the first security information and the first verification information; displaying confusion information, the first security information, and the first verification information on a screen for the user to select; receiving a selection result of the user, and determining, according to the first correspondence, whether the selection result of the user meets a preset rule; and when the selection result of the user meets the preset rule, prompting the user that the terminal is in a second security mode. By using the present disclosure, security of a terminal can be improved.

8 Claims, 14 Drawing Sheets

(56) References Cited

FOREIGN PATENT DOCUMENTS

| EP | 1605330 A1 | 12/2005 |
|----|------------|---------|
| WO | 03003170 A1 | 1/2003 |
| WO | 03100580 A1 | 12/2003 |
| WO | 2006000369 A2 | 1/2006 |

OTHER PUBLICATIONS

Partial English Translation and Abstract of Chinese Patent Application No. CN102567680, Jul. 30, 2015, 6 pages.
Partial English Translation and Abstract of Chinese Patent Application No. CN102930317, Jul. 30, 2015, 5 pages.
"Trusted User Interface API," GlobalPlatform Device Technology, Version 1.0, Public Release, GPD_SPE_020, Jun. 2013, 48 pages.
Foreign Communication From A Counterpart Application, PCT Application No. PCT/CN2015/071428, International Search Report dated Apr. 28, 2015, 8 pages.
Foreign Communication From A Counterpart Application, PCT Application No. PCT/CN2015/071428, Written Opinion dated Apr. 28, 2015, 5 pages.
Tong, T., et al., "GuarDroid: A Trusted Path for Password Entry," In Mobile Security Technologies (MoST), Retrieved from the Internet: URL:http://citeseerx.ist.psu.edu/viewdoc/download?doi+10.1.1. 480.9704&rep1&type=pdf [retrieved on Feb. 26, 2016], May 2013, 10 pages.
Foreign Communication From A Counterpart Application, European Application No. 15741110.9, Partial Supplementary European Search Report dated Mar. 8, 2016, 7 pages.

| A | B | C | D | E | F | G | H | I | J | K | L | M |
|---|---|---|---|---|---|---|---|---|---|---|---|---|
| 8 | 4 | 0 | 3 | 7 | 1 | 6 | 0 | 9 | 2 | 1 | 6 | 9 |
| N | O | P | Q | R | S | T | U | V | W | X | Y | Z |
| 4 | 3 | 1 | 8 | 5 | 7 | 0 | 5 | 8 | 6 | 9 | 0 | 3 |

SECURITY MODE PROMPT METHOD AND APPARATUS

CROSS-REFERENCE TO RELATED APPLICATIONS

This application is a continuation of International Application No. PCT/CN2015/071428, filed on Jan. 23, 2015, which claims priority to Chinese Patent Application No. 201410267687.5, filed on Jun. 16, 2014, both of which are hereby incorporated by reference in their entireties.

TECHNICAL FIELD

The present disclosure relates to the field of electronic technologies, and in particular, to a security mode prompt method and apparatus.

BACKGROUND

Nowadays, various devices are becoming more intelligent, and one very important reason is that a large quantity of application software may provide functions of being downloaded by users and expanding devices. However, in this way, security problems become increasingly serious, and if a user downloads malicious software, the malicious software may cause a serious threat to a device. For the most sensitive mobile payment, a password entered by a user may be stolen by malicious software, and a paid amount may also be tampered with. To resolve this problem, a hardware switching isolation architecture is put forward in the industry, that is, software may run in a security mode and a normal mode, and software are completely isolated from each other. In the security mode, many hardware resources such as a touch screen and a memory in a device are exclusively used by software, which may ensure that key operations performed by a user are not attacked or stolen by malicious software. Therefore, generally, to improve security, a part requiring high-level security protection runs in the security mode, for example, an interface for entering a password by a user or an interface for confirming a payment. When an application program (such as a payment program) needs to use these interfaces, an invoking request is sent, and a device switches to the security mode. If malicious software runs in the device, the malicious software prevents the device from switching to the security mode. Therefore, a user needs to verify whether the device is in the security mode, and when confirming that the device is in the security mode, the user performs related operations, for example, enters a password. To allow the user to confirm that the device is in the security mode, the device must carry a security indicator. When the device switches to the security mode, the security indicator starts, outputs a security mode prompt signal, and prompts the user to perform related operations, which ensures that operations performed by the user are not stolen by malicious software.

An existing security mode prompt method is that, a secret picture only known by a user is placed in secure storage that can be accessed only in the security mode, and when a device enters the security mode, a system reads the secret picture and displays the picture on a screen; because the picture can be obtained only in the security mode, when seeing the picture, the user can believe that the device enters the security mode. In the security mode prompt manner, if an attacker has a specific target, the attacker may acquire the secret picture in another manner, such as peeking or image shooting, when the secret picture is displayed, then forge the secret picture, and embed the secret picture into malicious software. When the device needs to switch to the security mode, the malicious software runs, the device is prevented from switching to the security mode, the secret picture is displayed, and a security mode environment is forged, which makes the user mistakenly consider that the device is in the security mode and perform key operations. Therefore, the method for directly displaying secure storage information is easy to be stolen by others, and is not secure.

SUMMARY

Embodiments of the present disclosure provide a security mode prompt method and apparatus, which can improve security of a terminal.

A first aspect of the embodiments of the present disclosure provides a security mode prompt method, including when it is determined that a terminal is currently in a first security mode, acquiring prestored first security information, receiving first verification information entered by a user, and establishing a first correspondence between the first security information and the first verification information, displaying confusion information, the first security information, and the first verification information on a screen for the user to select, receiving a selection result of the user, and determining, according to the first correspondence, whether the selection result of the user meets a preset rule, and when the selection result of the user meets the preset rule, prompting the user that the terminal is in a second security mode.

Based on the first aspect, in a first feasible implementation manner, the first security information includes at least two characters, the first verification information includes at least two characters, and a length of the first security information is equal to a length of the first verification information, and the establishing a first correspondence between the first security information and the first verification information includes establishing a one-to-one correspondence between the characters in the first security information and the characters in the first verification information, and setting the one-to-one correspondence as the first correspondence.

Based on the first aspect or the first feasible implementation manner of the first aspect, in a second feasible implementation manner, before the displaying confusion information, the first security information, and the first verification information on a screen for the user to select, the method further includes acquiring prestored confusion information, or constructing the confusion information according to the first security information or the first verification information.

A second aspect of the present disclosure provides a security mode prompt method, including when it is determined that a terminal is currently in a first security mode, acquiring a prestored quantity of times of vibration, performing, according to the quantity of times of vibration, vibration that matches the quantity of times of vibration, and when a confirmation message of a user is received, entering a second security mode.

A third aspect of the present disclosure provides a security mode prompt method, including when it is determined that a first terminal is currently in a first security mode, acquiring, by the first terminal, a prestored private key, encrypting, by the first terminal, preset information according to the private key, to obtain a ciphertext, sending, by the first terminal, the ciphertext to a second terminal, so that the second terminal decrypts the ciphertext according to a public key corresponding to the private key, and sends feedback information according to a decryption result, receiving, by the first terminal, the feedback information sent by the second terminal, and when it is determined according to the feedback information that the decryption succeeds, entering, by the first terminal, a second security mode.

Based on the third aspect, in a first feasible implementation manner, the sending, by the first terminal, the ciphertext to a second terminal includes converting, by the first terminal, the ciphertext into a two-dimensional code, and displaying the two-dimensional code on a screen for the second terminal to scan.

A fourth aspect of the present disclosure provides a security mode prompt apparatus, including a first acquiring module configured to when determining that the apparatus is currently in a first security mode, acquire prestored first security information, a receiving and establishment module configured to receive first verification information entered by a user, and establish a first correspondence between the first security information and the first verification information, a display module configured to display confusion information, the first security information, and the first verification information on a screen for the user to select, a first receiving module configured to receive a selection result of the user, and determine, according to the first correspondence, whether the selection result of the user meets a preset rule, and a prompt module configured to when the selection result of the user meets the preset rule, prompt the user that the apparatus is in a second security mode.

Based on the fourth aspect, in a first feasible implementation manner, the receiving and establishment module includes a receiving unit configured to receive the first verification information entered by the user, and an establishment unit configured to establish a one-to-one correspondence between the characters in the first security information and the characters in the first verification information, and set the one-to-one correspondence as the first correspondence.

Based on the fourth aspect or the first feasible implementation manner of the fourth aspect, in a second feasible implementation manner, the apparatus further includes a second acquiring module or a construction module, where the second acquiring module is configured to acquire prestored confusion information, and the construction module is configured to construct the confusion information according to the first security information or the first verification information.

A fifth aspect of the present disclosure provides a security mode prompt apparatus, including a third acquiring module configured to when determining that the apparatus is currently in a first security mode, acquire a prestored quantity of times of vibration, a vibration module configured to perform, according to the quantity of times of vibration, vibration that matches the quantity of times of vibration, and a first entering module configured to when a confirmation message of a user is received, enter a second security mode.

A sixth aspect of the present disclosure provides a security mode prompt apparatus, including a fourth acquiring module configured to when determining that a first apparatus is currently in a first security mode, acquire a prestored private key, an encryption module configured to encrypt preset information according to the private key, to obtain a ciphertext, a sending module configured to send the ciphertext to a second apparatus, so that the second apparatus decrypts the ciphertext according to a public key corresponding to the private key, and sends feedback information according to a decryption result, a second receiving module configured to receive the feedback information sent by the second apparatus, and a second entering module configured to when determining according to the feedback information that the decryption succeeds, enter a second security mode.

Based on the sixth aspect, in a first feasible implementation manner, the sending module is configured to convert the ciphertext into a two-dimensional code, and display the two-dimensional code on a screen for the second apparatus to scan.

In the embodiments of the present disclosure, when it is determined that a local terminal is in a first security mode, prestored first security information is acquired; first verification information entered by a user is received, and a first correspondence between the first security information and the first verification information is established; confusion information, the first security information, and the first verification information are displayed on a screen for the user to select; after selection of the user, a selection result of the user is received, and whether the selection result of the user meets a preset rule is determined according to the first correspondence; and when the selection result of the user meets the preset rule, the user is prompted that the terminal is in a second security mode. In the embodiments of the present disclosure, the prestored first security information is not directly output, but the first correspondence between the first security information and the first verification information is established, the confusion information, the first security information, and the first verification information are displayed on the screen for the user to perform verification and selection, and whether the selection result of the user meets the preset rule is determined according to the first correspondence, so as to prompt the user that the terminal is in the second security mode. Therefore, in this manner, the first security information cannot be obtained in another manner such as peeking or image shooting. Therefore, the security mode prompt method is highly secure and practical.

In the embodiments of the present disclosure, when it is determined that a terminal is currently in a first security mode, a prestored quantity of times of vibration is acquired; vibration that matches the quantity of times of vibration is performed according to the quantity of times of vibration; and a user performs confirmation according to the quantity of times of vibration, and when a confirmation message of the user is received, the terminal enters a second security mode. In the embodiments of the present disclosure, the prestored quantity of times of vibration is not directly output, but vibration that matches the quantity of times of vibration is performed, so that the user performs confirmation according to the quantity of times of vibration perceived by the user, and when receiving the confirmation message of the user, the terminal enters the second security mode again. Therefore, in this manner, the quantity of times of vibration cannot be obtained in another manner such as peeking or image shooting, and the security mode prompt method is highly secure and practical.

In the embodiments of the present disclosure, when it is determined that a first terminal is currently in a first security mode, a prestored private key is acquired; preset information is encrypted according to the acquired private key, to obtain a ciphertext; the ciphertext is sent to a second terminal, so that the second terminal decrypts the ciphertext according to a public key corresponding to the private key, and sends feedback information according to a decryption result; and when the first terminal receives the feedback information sent by the second terminal, and it is confirmed according to the feedback information that the decryption succeeds, the first terminal enters a second security mode. In the embodiments of the present disclosure, the prestored private key is not directly output, but the preset information is encrypted by using the private key, to obtain the ciphertext, the ciphertext is sent to the second terminal for verification, and when successfully decrypting the ciphertext by using the public key corresponding to the private key, the second terminal enters the second security mode. Therefore, in this manner, the private key cannot be obtained in another manner such as peeking or image shooting, and the security mode prompt method is highly secure and practical.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

A security mode prompt method in the embodiments of the present disclosure may be applied to a payment application program, for example, when a payment program runs, and an interface for entering a password by a user or an interface for confirming a payment is used, the payment program sends a security mode invoking request, to request switching to a security mode. When it is determined that a device is currently in a first security mode, a first security mode prompt message needs to be sent to the user, enabling the user to perceive that the device is currently in the first security mode. The first security mode prompt message may be that a security indicator in a status bar of a terminal is on, and a secret picture is displayed. Whether the terminal is in a second security mode is further verified, and a specific verification method may be that verification is performed in several security mode prompt methods provided in the embodiments of the present disclosure. The embodiments of the present disclosure provide the security mode prompt method having higher security. Many resources such as hardware and a memory are exclusively used in a security mode; therefore, in the security mode, operations performed by a user may not be stolen by malicious software.

The security mode prompt method provided in the embodiments of the present disclosure is introduced and described below with reference to FIG. 1 to FIG. 14.

Figure 1:
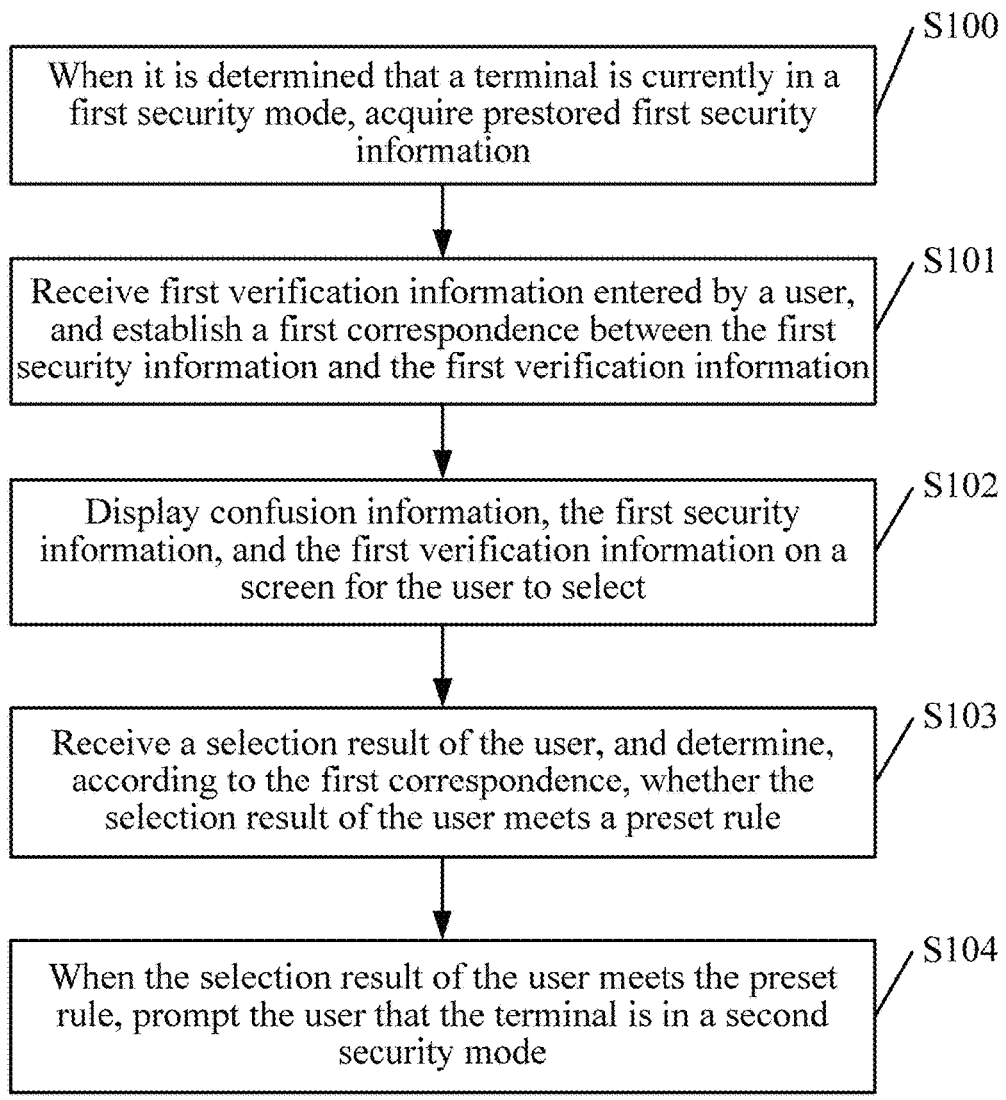
FIG. 1 is a schematic flowchart of a security mode prompt method according to an embodiment of the present disclosure.

Refer to FIG. 1, which is a schematic flowchart of a security mode prompt method according to an embodiment of the present disclosure. As shown in FIG. 1, the security mode prompt method in this embodiment includes the following steps. S100: When it is determined that a terminal is currently in a first security mode, acquire prestored first security information.

In an embodiment, the first security information may be information stored in secure storage, and the secure storage is storage space that can be accessed only in a security mode. Therefore, when a local terminal is in the first security mode, the first security information stored in the secure storage may be accessed. Therefore, the first security information may indicate that the local terminal is currently in the security mode. When it is determined that the local terminal is currently in the first security mode, the prestored first security information is read from the secure storage. It should be noted that, the first security information may be information in any form, for example, may be a character password or the like.

Figure 2:
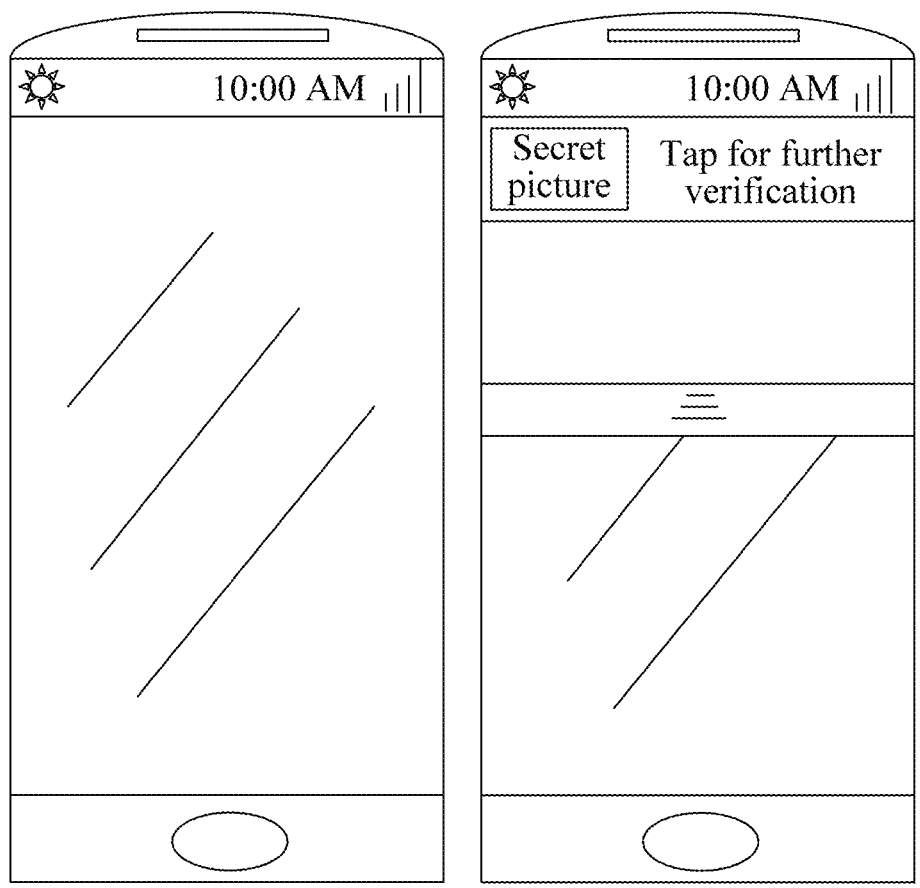
FIG. 2 is a diagram of an application scenario of a first security mode according to an embodiment of the present disclosure.

Further, when it is determined that the local terminal is currently in the first security mode, a screen of the terminal displays a security indicator, so as to prompt a user that the local terminal is in the first security mode, and the user may verify whether the local terminal is in a second security mode. Herein, description is made by using a mobile phone as an example. As shown in FIG. 2, when the local terminal switches to the first security mode, a security indicator is displayed in a status bar on a screen of the mobile phone, which is shown on the first mobile phone screen in FIG. 2. Because the status bar may generally be displayed in all software, and is easily forged by malicious software, the user needs to further verify a security indicator in a software form, that is, verify whether the local terminal is in the second security mode. It should be noted that, when the local terminal is in the second security mode, the user may perform related key operations, for example, entering a payment password or the like. After seeing the security indicator, the user pulls down the status bar, the screen of the mobile phone displays a secret picture, as shown on the second mobile phone screen in FIG. 2, and the secret picture is a secret picture stored in the secure storage. Because the secret picture may be stolen by an intentional attacker through image shooting, even though the secret picture seen by the user is the secret picture stored in the secure storage, the user also cannot determine that the terminal is currently in the second security mode. Therefore, further verification is needed, and first verification information is entered. As shown in FIG. 2, the secret picture is tapped to perform further verification, and the first verification information is entered for verification. When it is detected that the user taps the secret picture, the mobile phone acquires the prestored first security information from the secure storage, and further verifies whether the local terminal is in the second security mode, so as to prompt the user that the mobile phone is currently in the second security mode, to perform key operations, for example, enter a password or the like.

S101: Receive first verification information entered by a user, and establish a first correspondence between the first security information and the first verification information.

In an embodiment, a method for directly displaying the first security information in the secure storage to the user is not secure, for example, a purposeful attacker may obtain the first security information in another manner such as image shooting or peeking, forge the first security information, and embed the first security information into malicious software. When needing to switch to the second security mode, the local terminal is prevented from switching to the second security mode, and the forged first security information is displayed, which makes the user mistakenly consider that the local terminal is currently in the second security mode and perform key operations. Therefore, the method is not secure. In this embodiment of the present disclosure, the first verification information entered by the user is received, and the first correspondence between the first security information and the first verification information is established. It should be noted that, the first correspondence may exist in a form of a comparison table.

For example, if the prestored first security information is English letters "ABC", and the first verification information entered by the user is "356", establishing the first correspondence between the first security information and the first verification information may be establishing a correspondence between the letter "A" and the number "3", establishing a correspondence between the letter "B" and the number "5", and establishing a correspondence between the letter "C" and the number "6".

S102: Display confusion information, the first security information, and the first verification information on a screen for the user to select.

In an embodiment, the confusion information may be any information of a type the same as that of the first security information or the first verification information, that is, the first security information is hidden in the confusion information. A manner of displaying the confusion information is determined according to a manner of displaying the first security information and a manner of displaying the first verification information.

If the prestored first security information is English letters "ABC", the first verification information entered by the user is "356", and the numbers are individually displayed, the confusion information may be at least one in the 26 English letters after the letters in the first security information are removed and/or at least one in the 10 numeric characters after the characters in the first verification information are removed. During selection, the user may successively select, in all the displayed characters, the characters in the first security information and the characters in the first verification information, and the successive selection may indicate the correspondence between the first security information and the first verification information.

If the prestored first security information is English letters "ABC", and the first verification information entered by the user is "356", when the English letters and numbers are displayed by using the first correspondence, the confusion information may also be displayed by using a second correspondence, and the first correspondence and the second correspondence may be displayed on the screen in a disorderly arrangement manner. It should be noted that, the second correspondence is a confusion correspondence, that is, corresponding may randomly be performed in the second correspondence. Moreover, the first correspondence differs from the second correspondence. After the first correspondence and the second correspondence are displayed on the screen, the user may perform verification in all the correspondences, for example, the user may tap, on the screen, an option of a correct correspondence between the first security information and the entered first verification information. The user may also select an option of the second correspondence, and a specific selection method may be performing selection according to a preset rule.

S103: Receive a selection result of the user, and determine, according to the first correspondence, whether the selection result of the user meets a preset rule.

In an embodiment, the terminal receives the selection result of the user, and determines, according to the first correspondence, whether the selection result of the user meets the preset rule.

Herein, description is continued by using examples. If the prestored first security information is English letters "ABC", the first verification information entered by the user is "356", and the numbers are individually displayed, during selection, the user also successively selects, in all the displayed characters, the characters in the first security information and the characters in the first verification information, and whether a selection sequence of the user is "ABC356" is determined. If yes, it is determined that the selected characters conform to the first correspondence, that is, meet the preset rule; if not, it is determined that the selected characters do not conform to the first correspondence, that is, do not meet the preset rule.

If the prestored first security information is English letters "ABC", and the first verification information entered by the user is "356", when the English letters and numbers are displayed by using the first correspondence, the confusion information may also be displayed by using the second correspondence. The preset rule is that the user selects an option of the first correspondence. During selection of the user, if the selected option completely matches the first correspondence, the selection result of the user meets the preset rule; if the selected option does not completely match the first correspondence, the selection result of the user does not meet the preset rule. Further, if the preset rule is that the user selects an option of the second correspondence, during selection of the user, if the selected option completely matches the second correspondence, the selection result of the user meets the preset rule; if the selected option does not completely match the second correspondence, the selection result of the user does not meet the preset rule.

S104: When the selection result of the user meets the preset rule, prompt the user that the terminal is in a second security mode.

In an embodiment, when the selection result generated by tapping by the user meets the preset rule, the user is prompted that the terminal is in the second security mode, and in the second security mode, the user may perform key operations, such as performing payment or entering a password.

In this embodiment of the present disclosure, when it is determined that a local terminal is in a first security mode, prestored first security information is acquired; first verification information entered by a user is received, and a first correspondence between the first security information and the first verification information is established; confusion information, the first security information, and the first verification information are displayed on a screen for the user to select; after selection of the user, a selection result of the user is received, and whether the selection result of the user meets a preset rule is determined according to the first correspondence; and when the selection result of the user meets the preset rule, the user is prompted that the terminal is in a second security mode. In this embodiment of the present disclosure, the prestored first security information is not directly output, but the first correspondence between the first security information and the first verification information is established, the confusion information, the first security information, and the first verification information are displayed on the screen for the user to perform verification and selection, and whether the selection result of the user meets the preset rule is determined according to the first correspondence, so as to prompt the user that the terminal is in the second security mode. Therefore, in this manner, the first security information cannot be obtained in another manner such as peeking or image shooting. Therefore, the security mode prompt method is highly secure and practical.

Figure 3:
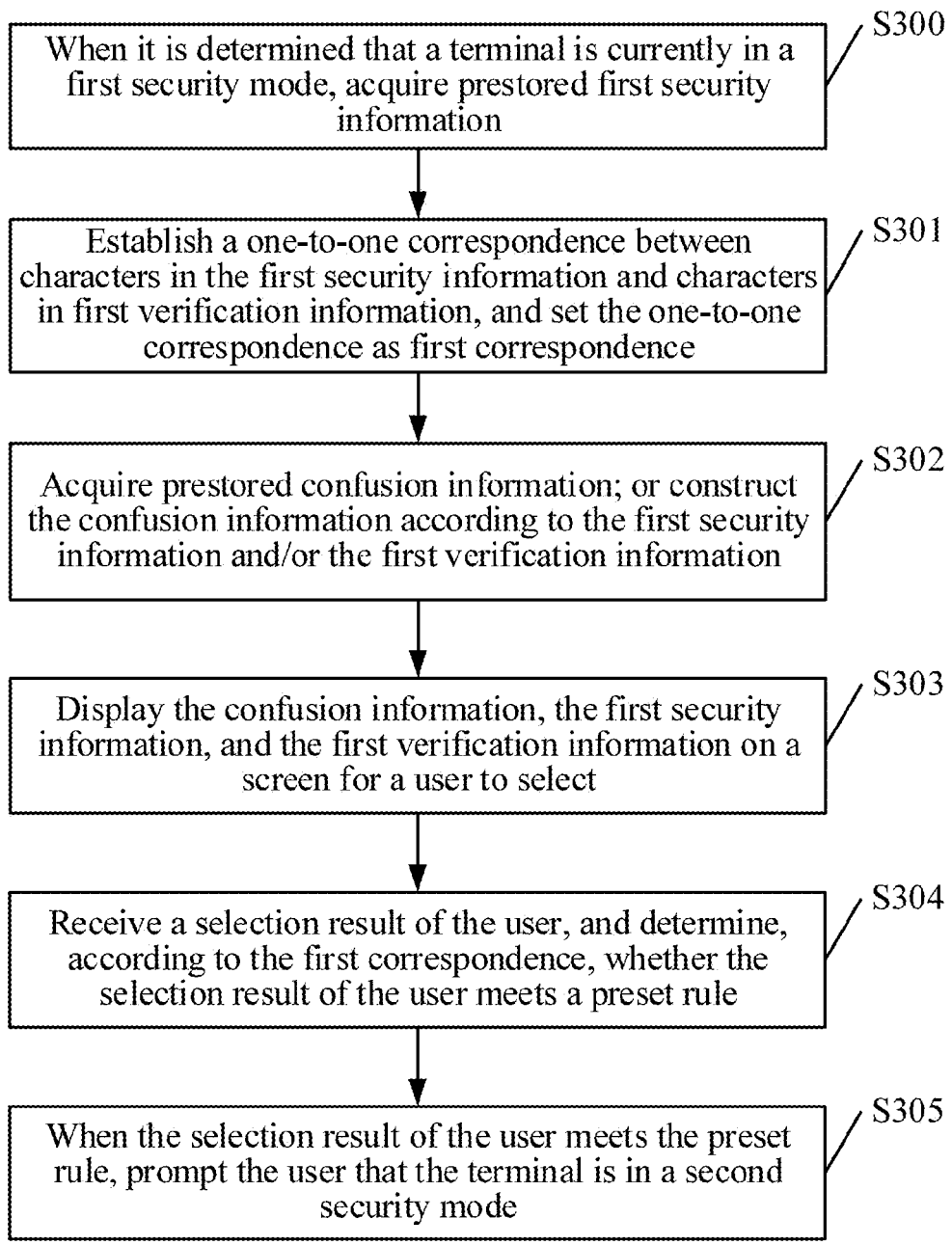
FIG. 3 is a schematic flowchart of another security mode prompt method according to an embodiment of the present disclosure.

Refer to FIG. 3, which is a schematic flowchart of another security mode prompt method according to an embodiment of the present disclosure. In an implementation manner, first security information includes at least two characters, first verification information also includes at least two characters, and a length of the first security information is equal to a length of the first verification information. The characters included in the first security information may be characters of a first type. As shown in FIG. 3, the security mode prompt method in this embodiment includes the following steps.

S300: When it is determined that a terminal is currently in a first security mode, acquire prestored first security information.

For step S300 in this embodiment of the present disclosure, refer to step S100 in the embodiment shown in FIG. 1, and details are not described herein.

S301: Receive first verification information entered by a user, establish a one-to-one correspondence between characters in the first security information and characters in the first verification information, and set the one-to-one correspondence as the first correspondence.

As an optional implementation manner, the characters included in the first security information may be characters of the first type, and characters included in the first verification information entered by the user may be characters of a second type. It should be noted that, characters of the first type may be English characters (26 English letters), numeric characters (numeric characters which are 0 to 9), or other characters. The first verification information entered by the user is received, the characters included in the first verification information may be characters of the second type, and characters of the first type differ from characters of the second type. For example, if characters of the first type are English characters, characters of the second type are numeric characters; if characters of the first type are numeric characters, characters of the second type are English characters. It should be noted that, a quantity of digits of the characters in the first security information may be the same as a quantity of digits of the characters in the first verification information. The one-to-one correspondence between the characters in the first security information and the characters in the first verification information is established, and the one-to-one correspondence is set as the first correspondence.

Figures 4, 5:
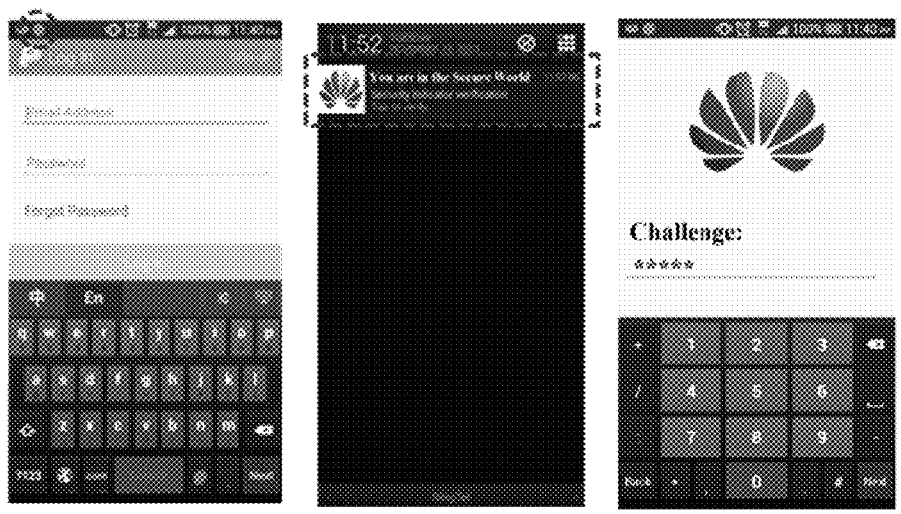
FIG. 4 is a diagram of an application scenario of a security mode according to an embodiment of the present disclosure.
FIG. 5 is a schematic diagram of a comparison table according to an embodiment of the present disclosure.

In a specific application scenario, when an application interface of an application program needs to invoke a second security mode, the terminal first enters the first security mode. For example, as shown in FIG. 4, on the first screen interface, when an application program needs to invoke an interface on which a user enters a password to log in, a security indicator is simulated in a status bar of a screen, to prompt the user that the local terminal is currently in the first security mode. However, because it is very easy to forge the software indicator, the user needs to perform further verification. The user pulls down the status bar, as shown in the second screen in FIG. 4, the screen displays a secret picture, and the secret picture is a picture stored in secure storage of the local terminal. When the local terminal switches to the first security mode, the secret picture in the secure storage is read and displayed, so as to prompt the user that the local terminal is currently in the first security mode. Because the secret picture may be obtained by an attacker by peeking or image shooting purposefully, when seeing the secret picture, the user further needs to verify whether the local terminal is currently in the second security mode. Therefore, the user taps the secret picture, and when the local terminal detects that the user taps the secret picture, the third interface in FIG. 4 is displayed, and a numerical keypad appears in a system, to prompt the user to enter the first verification information. When the user enters the first verification information, the first verification information entered by the user is received, and the characters included in the first verification information are characters of the second type. Herein, description is made by using an example in which characters of the first type are English characters, and characters of the second type are numeric characters. The local terminal receives the numeric characters entered by the user. It should be noted that, the characters entered by the user need to be masked, are indicated by using symbols "*", and are not directly displayed in the screen, and the characters entered by the user are random characters.

First correspondences between the characters included in the first security information and the characters included in the first verification information are successively set, and the characters in the first security information are in one-to-one correspondence with the characters in the first verification information. Herein, description is made by using an example in which the first security information is "PATEN". When the first verification information entered by the user is "18074", the first correspondences are P-1, A-8, T-0, E-7, and N-4. It should be noted that, if there are repeated letters, a correspondence is subjected to a correspondence of the first letter of the repeated letters, for example, if first character information is "PATENT", the last T corresponds to 0.

S302: Acquire prestored confusion information, or construct confusion information according to the first security information and/or the first verification information.

As an optional implementation manner, the confusion information may be prestored, that is, preset. When the confusion information is needed, the prestored confusion information is directly acquired. The confusion information may be constructed according to the first security information and/or the first verification information. A manner of constructing the confusion information needs to be determined according to a preset rule. For example, if the prestored first security information is English letters "ABC", the first verification information entered by the user is "356", and the numbers are individually displayed, and when performing verification, the user also successively enters the first security information and the first verification information, the confusion information may be at least one in the 26 English letters except the letters "ABC", or may be at least one in the 10 numeric characters except "356", or may be a combination thereof. Further, if the prestored first security information is English letters "ABC", the first verification information entered by the user is "356", the English letters and numbers are displayed by using the first correspondence, and the user performs selection according to the first correspondence, the confusion information may be a second correspondence. Herein, constructing the second correspondence is described in detail.

Herein, description is continued by using an example in which the second correspondence is constructed in a mobile phone, and it is assumed that the second correspondence is a correspondence between the first character information and second character information. Characters included in the first character information and the characters included in the first security information are different, but are all characters of the first type. Herein, description is continued by using an example in which characters of the first type are English characters, and the characters included in the first character information may be all remaining characters in the English alphabet except the characters in the first security information, or may be some remaining characters in the English alphabet except the characters in the first security information. Herein, description is continued by using an example in which the first character information is "PATEN", and the first character information may be "BCDFG", or may be all remaining characters in the 26 English characters except "PATEN". A second correspondence between each character in the first character information and a character in the second character information is set, and the second correspondence is also a one-to-one correspondence. It should be noted that, the characters included in the second character information may be characters of the second type, that is, any character between 0 and 9. For example, it may be set that a character B corresponds to a character 4, and a character C corresponds to a character 0.

S303: Display the confusion information, the first security information, and the first verification information on a screen for the user to select.

As an optional implementation manner, after the confusion information is acquired or constructed, the confusion information, the first security information, and the first verification information need to be displayed on the screen for the user to select. A specific display manner may be individually displayed, or may be displayed in a correspondence manner. Herein, description is continued by using an example in which displaying is performed in the correspondence manner.

After setting of both the first correspondence and the second correspondence is completed, the second correspondence and the first correspondence are displayed on the screen for the user to perform verification. A specific display manner may be establishing a comparison table including the first correspondence and the second correspondence, that is, establishing a comparison table including a correspondence between a character of the first type and a character of the second type, so that the user can perform verification according to the comparison table.

Figure 6:
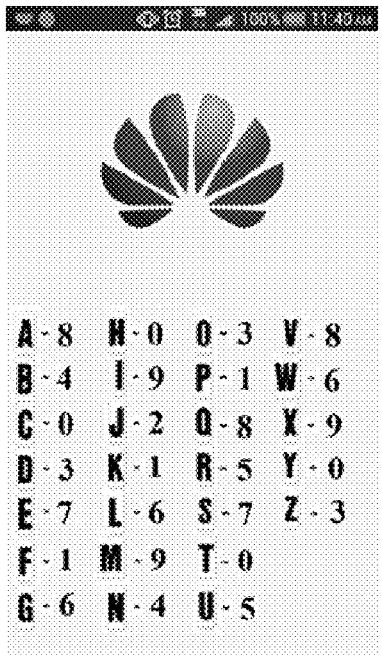
FIG. 6 is a schematic diagram of screen displaying according to an embodiment of the present disclosure.

FIG. 5 shows a comparison table of the first correspondence and the second correspondence. The first character information "PATEN" corresponds to characters "18074", and the second correspondence is that all English characters in the 26 English characters except the characters "PATEN" are randomly in one-to-one correspondence with 0 to 9, for example, B corresponds to 4, and H corresponds to 0. The user may perform verification on the screen. FIG. 6 shows a screen interface on which a terminal outputs a comparison table. The comparison table displayed on the interface is the comparison table shown in FIG. 5. The user may verify in the comparison table whether a correspondence between the characters included in the first security information and the characters included in the first verification information entered by the user is correct, and if the correspondence is correct, the user taps a corresponding option. It should be noted that, the user may also tap an option of the second correspondence. A specific selection manner needs to be determined according to a preset rule.

Herein, description is continued by using verification in the terminal as an example. As shown in FIG. 6, the first security information is "PATEN", the first verification information is "18074", and the user finds that "PATEN" are correctly in one-to-one correspondence with "18074" on the screen, a corresponding option is checked for verification.

S304: Receive a selection result of the user, and determine, according to the first correspondence, whether the selection result of the user meets a preset rule.

As an optional implementation manner, the selection result of the user is received, and whether the selection result of the user meets the preset rule is determined according to the first correspondence. A determining method may be determined according to a display manner and a preset rule. Herein, description is continued by using an example in which the display manner is performing displaying by using a correspondence.

When the selection result of the user completely matches the first correspondence or the selection result of the user completely matches the second correspondence, the selection result of the user meets the preset rule. In this implementation manner, the first security information stored in the secure storage of the local terminal is not displayed on the screen individually and directly, but hidden in the comparison table according to a corresponding rule. The user may determine, through verification according to the comparison table, that the local terminal is in the second security mode.

S305: When the selection result of the user meets the preset rule, prompt the user that the terminal is in a second security mode.

As an optional implementation manner, when the selection result of the user meets the preset rule, the user is prompted that the terminal is in the second security mode, and in the second security mode, the user may perform key operations, such as performing payment or entering a password.

In this embodiment of the present disclosure, when it is determined that a local terminal is in a first security mode, prestored first security information is acquired; first verification information entered by a user is received, and a first correspondence between the first security information and the first verification information is established; confusion information, the first security information, and the first verification information are displayed on a screen for the user to select; after selection of the user, a selection result of the user is received, and whether the selection result of the user meets a preset rule is determined according to the first correspondence; and when the selection result of the user meets the preset rule, the user is prompted that the terminal is in a second security mode. In this embodiment of the present disclosure, the prestored first security information is not directly output, but the first correspondence between the first security information and the first verification information is established, the confusion information, the first security information, and the first verification information are displayed on the screen for the user to perform verification and selection, and whether the selection result of the user meets the preset rule is determined according to the first correspondence, so as to prompt the user that the terminal is in the second security mode. Therefore, in this manner, the first security information cannot be obtained in another manner such as peeking or image shooting. Therefore, the security mode prompt method is highly secure and practical.

Figure 7:
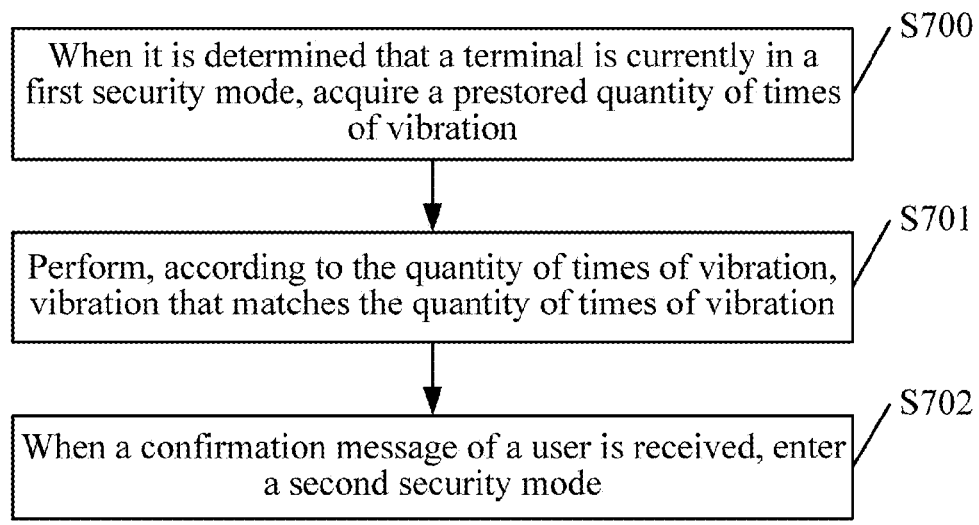
FIG. 7 is a schematic flowchart of still another security mode prompt method according to an embodiment of the present disclosure.

Refer to FIG. 7, which is a schematic flowchart of still another security mode prompt method according to an embodiment of the present disclosure. In an implementation manner, first security information includes a prestored quantity of times of vibration. The security mode prompt method in this embodiment includes the following steps. S700: When it is determined that a terminal is currently in a first security mode, acquire a prestored quantity of times of vibration.

As an optional implementation manner, the first security information stored in secure storage is a natural number, and the natural number is a secret quantity, which is stored in the secure storage and is specified by a user when a device is initialized, of times of vibration. The secure storage can be accessed only in a security mode. When it is determined that the terminal is in the first security mode, the prestored quantity of times of vibration is acquired.

S701: Perform, according to the quantity of times of vibration, vibration that matches the quantity of times of vibration.

Figure 8:
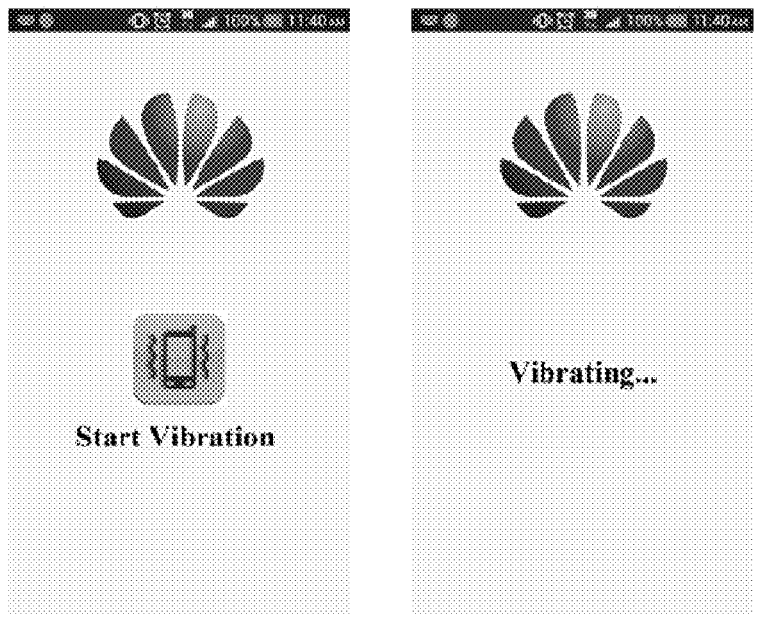
FIG. 8 is a scenario diagram of vibration prompting according to an embodiment of the present disclosure.

As an optional implementation manner, the terminal reads the prestored quantity of times of vibration from the secure storage, vibration of the local terminal is controlled, and the quantity of times of vibration matches the read number of times of vibration. FIG. 8 shows a vibration screen interface when a local terminal vibrates. If the quantity of times of vibration perceived by the user is exactly the natural number prestored in the secure storage, a confirmation message is entered. If the quantity of times of vibration perceived by the user is not the natural number prestored in the secure storage, a confirmation failure message is entered. In this embodiment, a vibration manner enables the user to directly perform perceiving, and displaying is not needed, and therefore, the first security information stored in the secure storage also cannot be obtained in another manner such as peeking or image shooting. The security mode prompt manner has high security.

S702: When a confirmation message of a user is received, enter a second security mode.

As an optional implementation manner, when the terminal receives the confirmation message of the user, the terminal is controlled to enter the second security mode, for example, an interface for entering a password pops up.

In this embodiment of the present disclosure, when it is determined that a terminal is currently in a first security mode, a prestored quantity of times of vibration is acquired; vibration that matches the quantity of times of vibration is performed according to the quantity of times of vibration; and a user performs confirmation according to the quantity of times of vibration, and when a confirmation message of the user is received, the terminal enters a second security mode. In this embodiment of the present disclosure, the prestored quantity of times of vibration is not directly output, but vibration that matches the quantity of times of vibration is performed, so that the user performs confirmation according to the quantity of times of vibration perceived by the user, and when receiving the confirmation message of the user, the terminal enters the second security mode again. Therefore, in this manner, the quantity of times of vibration cannot be obtained in another manner such as peeking or image shooting, and the security mode prompt method is highly secure and practical.

Figure 9:
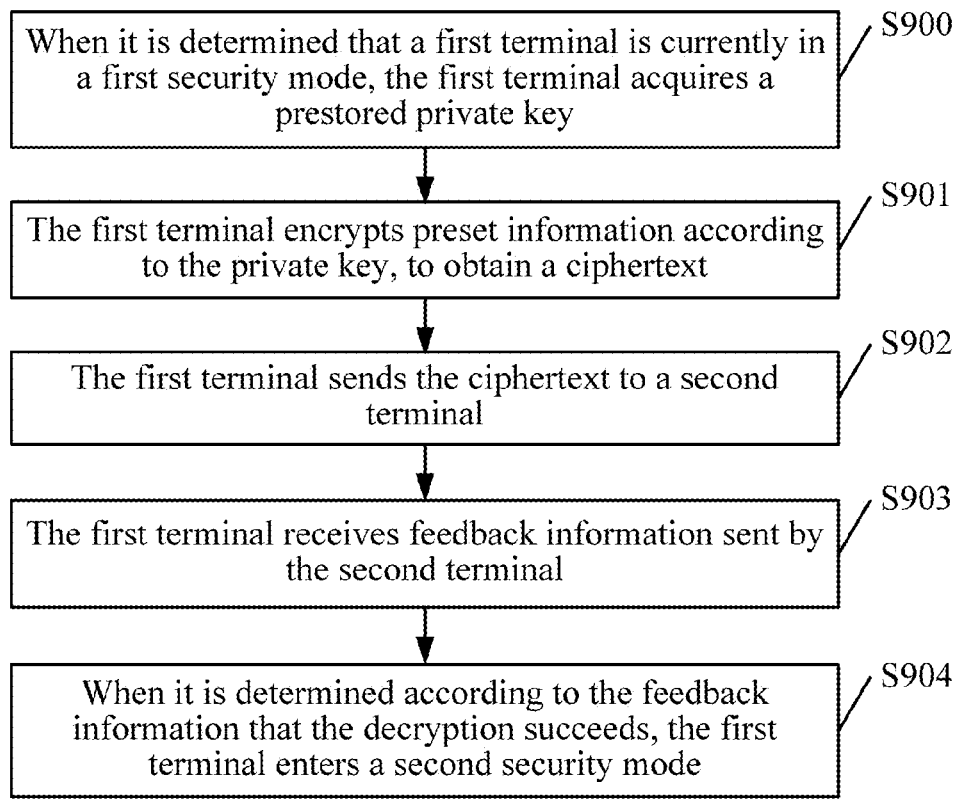
FIG. 9 is a schematic flowchart of yet another security mode prompt method according to an embodiment of the present disclosure.

Refer to FIG. 9, which is a schematic flowchart of yet another security mode prompt method according to an embodiment of the present disclosure. In an implementation manner, first security information is a private key stored in secure storage. The security mode prompt method in this embodiment includes the following steps. S900: When it is determined that a first terminal is currently in a first security mode, the first terminal acquires a prestored private key.

As an optional implementation manner, when it is determined that the first terminal is currently in the first security mode, the prestored private key is acquired. It should be noted that, the first security mode may be that, an indicator in a status bar of the first terminal is on, and a secret picture is displayed.

S901: The first terminal encrypts preset information according to the private key, to obtain a ciphertext.

As an optional implementation manner, when the first security information stored in the secure storage is the private key, the preset information is acquired, and it is assumed that the preset information is M. A digital signature operation is performed on the preset information by using the private key and a digital signature algorithm, so as to encrypt the preset information, to obtain the ciphertext, and it is assumed that the ciphertext is Sig(M). It should be noted that, when the first terminal performs presetting, a key/public key pair may be generated, the key is in one-to-one correspondence with the public key, the generated key is stored in the secure storage of the first terminal, and the public key is sent to a second terminal. The preset information may be an application (APP) name, a date, a time, a mobile phone identifier name, and the like. A process of performing a digital signature operation on the preset information by the first terminal by using the private key is verifying whether the private key is a private key in the secure storage.

S902: The first terminal sends the ciphertext to a second terminal, so that the second terminal decrypts the ciphertext according to a public key corresponding to the private key, and sends feedback information according to a decryption result.

As an optional implementation manner, the first terminal sends the obtained ciphertext to the second terminal, and the second terminal decrypts the ciphertext according to the public key corresponding to the private key, and sends the feedback information according to the decryption result. It should be noted that, the feedback information may include whether the second terminal successfully decrypts the ciphertext.

Figure 10:
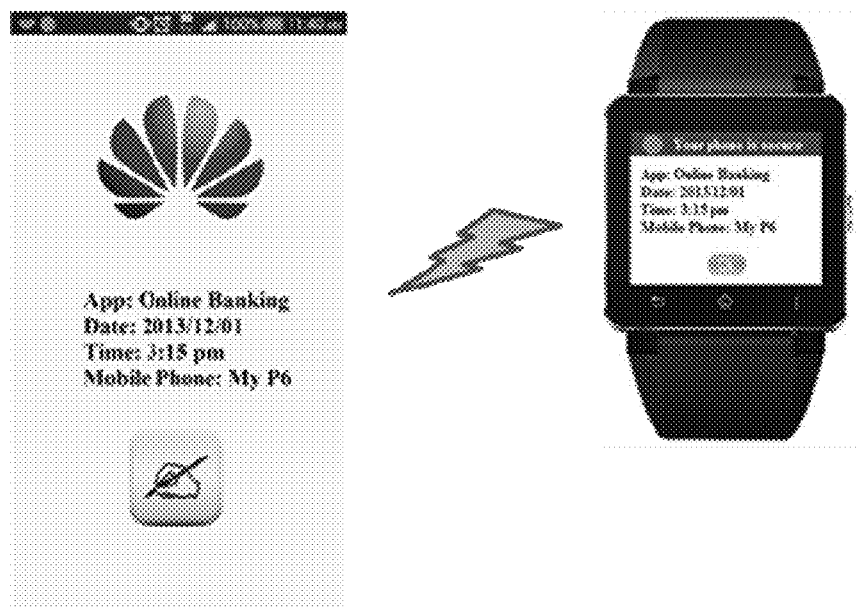
FIG. 10 is a schematic diagram of key verification according to an embodiment of the present disclosure.

Further, the second terminal may be a watch, which is shown in FIG. 10. Because less software is installed, and the second terminal of this type is an auxiliary functional device of a mobile phone in most cases, an intrusion opportunity is low, and it may be assumed that the second terminal is a trusted apparatus. Further, the mobile phone may send the ciphertext to the watch by using BLUETOOTH or wireless fidelity (WIFI), and after the watch receives the ciphertext, the ciphertext is decrypted by using the public key corresponding to the private key. A specific decryption process may be that, herein, description is continued by using an example in which the preset information is M and the ciphertext is Sig(M), the watch decrypts the ciphertext by using a verification function such as Verify(M, Sig(M)) and the public key, and if Sig(M) is indeed used for encrypting the preset information M by using the private key in the secure storage, the function outputs a result 1, indicating that the decryption succeeds; otherwise, the function outputs 0, indicating that the decryption fails. Whether the decryption succeeds is encapsulated into feedback information, and the feedback information is sent to the first terminal, so that the first terminal is controlled to enter a second security mode. In this embodiment, whether the private key for performing encryption is the private key in the secure storage is verified mainly by using the public key.

S903: The first terminal receives the feedback information sent by the second terminal.

As an optional implementation manner, the first terminal receives the feedback information sent by the second terminal, and parses the received feedback information.

S904: When it is determined according to the feedback information that the decryption succeeds, the first terminal enters a second security mode.

As an optional implementation manner, when it is determined according to the feedback information received by the first terminal that the decryption succeeds, the first terminal enters the second security mode, and the second security mode may be a mode in which the user enters a payment password.

Further, when the first terminal enters the second security mode, the user may be notified in a screen display manner or vibration manner that the local terminal is in the second security mode.

In this embodiment of the present disclosure, when it is determined that a first terminal is currently in a first security mode, a prestored private key is acquired; preset information is encrypted according to the acquired private key, to obtain a ciphertext; the ciphertext is sent to a second terminal, so that the second terminal decrypts the ciphertext according to a public key corresponding to the private key, and sends feedback information according to a decryption result; and when the first terminal receives the feedback information sent by the second terminal, and it is confirmed according to the feedback information that the decryption succeeds, the first terminal enters a second security mode. In this embodiment of the present disclosure, the prestored private key is not directly output, but the preset information is encrypted by using the private key, to obtain the ciphertext, the ciphertext is sent to the second terminal for verification, and when successfully decrypting the ciphertext by using the public key corresponding to the private key, the second terminal enters the second security mode. Therefore, in this manner, the private key cannot be obtained in another manner such as peeking or image shooting, and the security mode prompt method is highly secure and practical.

Figure 11:
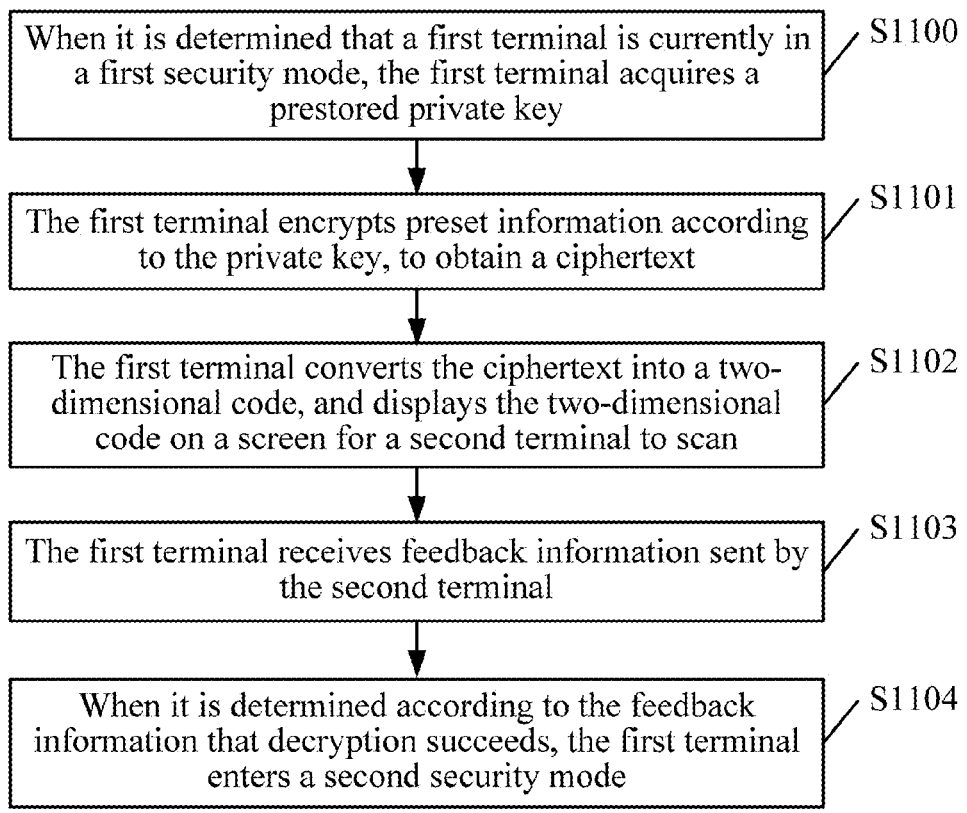
FIG. 11 is a schematic flowchart of still yet another security mode prompt method according to an embodiment of the present disclosure.

Refer to FIG. 11, which is a schematic flowchart of still yet another security mode prompt method according to an embodiment of the present disclosure. In an implementation manner, first security information is a private key stored in secure storage. The security mode prompt method in this embodiment includes the following steps. S1100: When it is determined that a first terminal is currently in a first security mode, the first terminal acquires a prestored private key.

For step S1100 in this embodiment of the present disclosure, refer to step S900 in the embodiment shown in FIG. 9, and details are not described herein.

S1101: The first terminal encrypts preset information according to the private key, to obtain a ciphertext.

For step S1101 in this embodiment of the present disclosure, refer to step S901 in the embodiment shown in FIG. 9, and details are not described herein.

S1102: The first terminal converts the ciphertext into a two-dimensional code, and displays the two-dimensional code on a screen for a second terminal to scan.

As an optional implementation manner, in order to send the ciphertext to the second terminal, the ciphertext may be converted into the two-dimensional code and the two-dimensional code is displayed on the screen, so that the second terminal having a camera scans the two-dimensional code, to obtain the preset information.

Figure 12:
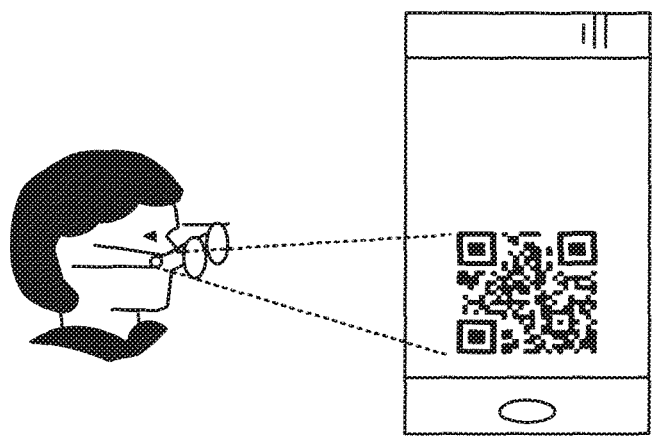
FIG. 12 is a schematic diagram of two-dimensional code verification according to an embodiment of the present disclosure.

The first terminal displays, on the screen of the first terminal, the two-dimensional code obtained by converting, and in order to verify whether a local terminal is currently in a second security mode, the user may scan the two-dimensional code by using the second terminal having a camera, for example, scan the two-dimensional code by using sun glasses. As shown in FIG. 12, a camera is set on a frame of sun glasses, and when the screen of the first terminal displays a two-dimensional code, the two-dimensional code is scanned by using the camera.

Further, the second terminal converts the scanned two-dimensional code into the ciphertext, and decrypts the ciphertext by using the public key corresponding to the private key. A specific decryption process may be that, herein, description is continued by using an example in which original information is M and the ciphertext is Sig(M), the second terminal, that is, sun glasses, decrypts the ciphertext by using a verification function such as Verify(M, Sig(M)) and the public key, and if Sig(M) is indeed used for encrypting the preset information M by using a private key in the secure storage, the function outputs a result 1, indicating that the decryption succeeds; otherwise, the function outputs 0, indicating that the decryption fails. In this embodiment, whether the private key for performing encryption is the private key in the secure storage is verified mainly by using the public key. Further, the second terminal may send the feedback information to the first terminal according to whether the decryption succeeds.

S1103: The first terminal receives feedback information sent by the second terminal.

For step S1103 in this embodiment of the present disclosure, refer to step S903 in the embodiment shown in FIG. 9, and details are not described herein.

S1104: When it is determined according to the feedback information that decryption succeeds, the first terminal enters a second security mode.

For step S1104 in this embodiment of the present disclosure, refer to step S904 in the embodiment shown in FIG. 9, and details are not described herein.

In this embodiment of the present disclosure, when it is determined that a first terminal is currently in a first security mode, a prestored private key is acquired; preset information is encrypted according to the acquired private key, to obtain a ciphertext; the ciphertext is sent to a second terminal, so that the second terminal decrypts the ciphertext according to a public key corresponding to the private key, and sends feedback information according to a decryption result; and when the first terminal receives the feedback information sent by the second terminal, and it is confirmed according to the feedback information that the decryption succeeds, the first terminal enters a second security mode. In this embodiment of the present disclosure, the prestored private key is not directly output, but the preset information is encrypted by using the private key, to obtain the ciphertext, the ciphertext is sent to the second terminal for verification, and when successfully decrypting the ciphertext by using the public key corresponding to the private key, the second terminal enters the second security mode. Therefore, in this manner, the private key cannot be obtained in another manner such as peeking or image shooting, and the security mode prompt method is highly secure and practical.

Figure 13:
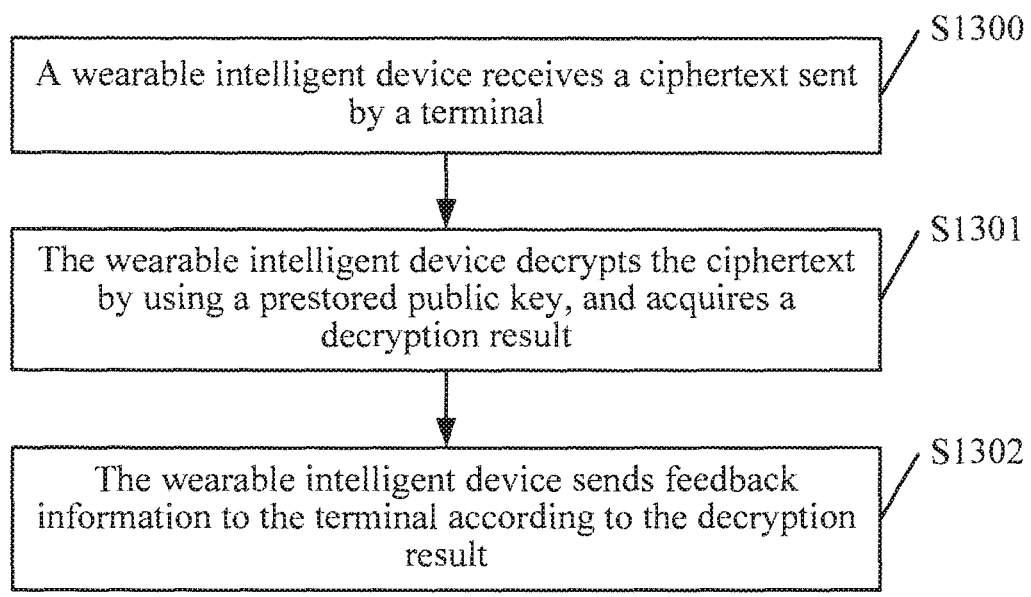
FIG. 13 is a schematic flowchart of a security mode prompt method provided on a second terminal side according to an embodiment of the present disclosure.

FIG. 13 illustrates a security mode prompt method from a second terminal side according to an embodiment of the present disclosure. Specific implementation steps are as follows. S1300: A second terminal receives a ciphertext sent by a first terminal.

The second terminal may receive, by using BLUETOOTH or WIFI, the ciphertext sent by the first terminal. It should be noted that, the second terminal may be a watch or the like.

Further, when the first terminal sends the ciphertext to the second terminal in a two-dimensional code manner, the second terminal scans a two-dimensional code on a screen of the first terminal. It should be noted that, the second terminal may be sun glasses, and the sun glasses have a camera, as shown in FIG. 12.

S1301: The second terminal decrypts the ciphertext by using a prestored public key, and acquires a decryption result.

The second terminal decrypts the ciphertext by using the prestored public key, and obtains the decryption result indicating whether the decryption succeeds. A specific decryption process may be that, herein, description is continued by using an example in which preset information is M and the ciphertext is Sig(M), the watch decrypts the ciphertext by using a verification function such as Verify(M, Sig(M)) and the public key, and if Sig(M) is indeed used for encrypting the preset information M by using the private key in secure storage, the function outputs a result 1, indicating that the decryption succeeds; otherwise, the function outputs 0, indicating that the decryption fails.

Further, when the second terminal scans the two-dimensional code on the screen of the first terminal, the second terminal inversely converts the two-dimensional code into a ciphertext according to a conversion rule of the two-dimensional code, and then decrypts the ciphertext, and obtains a decryption result. For a specific implementation method, reference may be made to an application scenario in FIG. 12.

S1302: The second terminal sends feedback information to the first terminal according to the decryption result.

As an optional implementation manner, whether the decryption succeeds is encapsulated into the feedback information, and the second terminal sends the feedback information to the first terminal, so that the first terminal determines, according to whether the decryption succeeds in the feedback information, whether the first terminal enters a second security mode. When determining, according to the feedback information, that the decryption succeeds, the first terminal enters the second security mode, and if the first terminal determines, according to the feedback information, that the decryption fails, the first terminal does not enter the second security mode.

In this embodiment of the present disclosure, when it is determined that a first terminal is currently in a first security mode, a prestored private key is acquired; preset information is encrypted according to the acquired private key, to obtain a ciphertext; the ciphertext is sent to a second terminal, so that the second terminal decrypts the ciphertext according to a public key corresponding to the private key, and sends feedback information according to a decryption result; and when the first terminal receives the feedback information sent by the second terminal, and it is confirmed according to the feedback information that the decryption succeeds, the first terminal enters a second security mode. In this embodiment of the present disclosure, the prestored private key is not directly output, but the preset information is encrypted by using the private key, to obtain the ciphertext, the ciphertext is sent to the second terminal for verification, and when successfully decrypting the ciphertext by using the public key corresponding to the private key, the second terminal enters the second security mode. Therefore, in this manner, the private key cannot be obtained in another manner such as peeking or image shooting, and the security mode prompt method is highly secure and practical.

Figure 14:
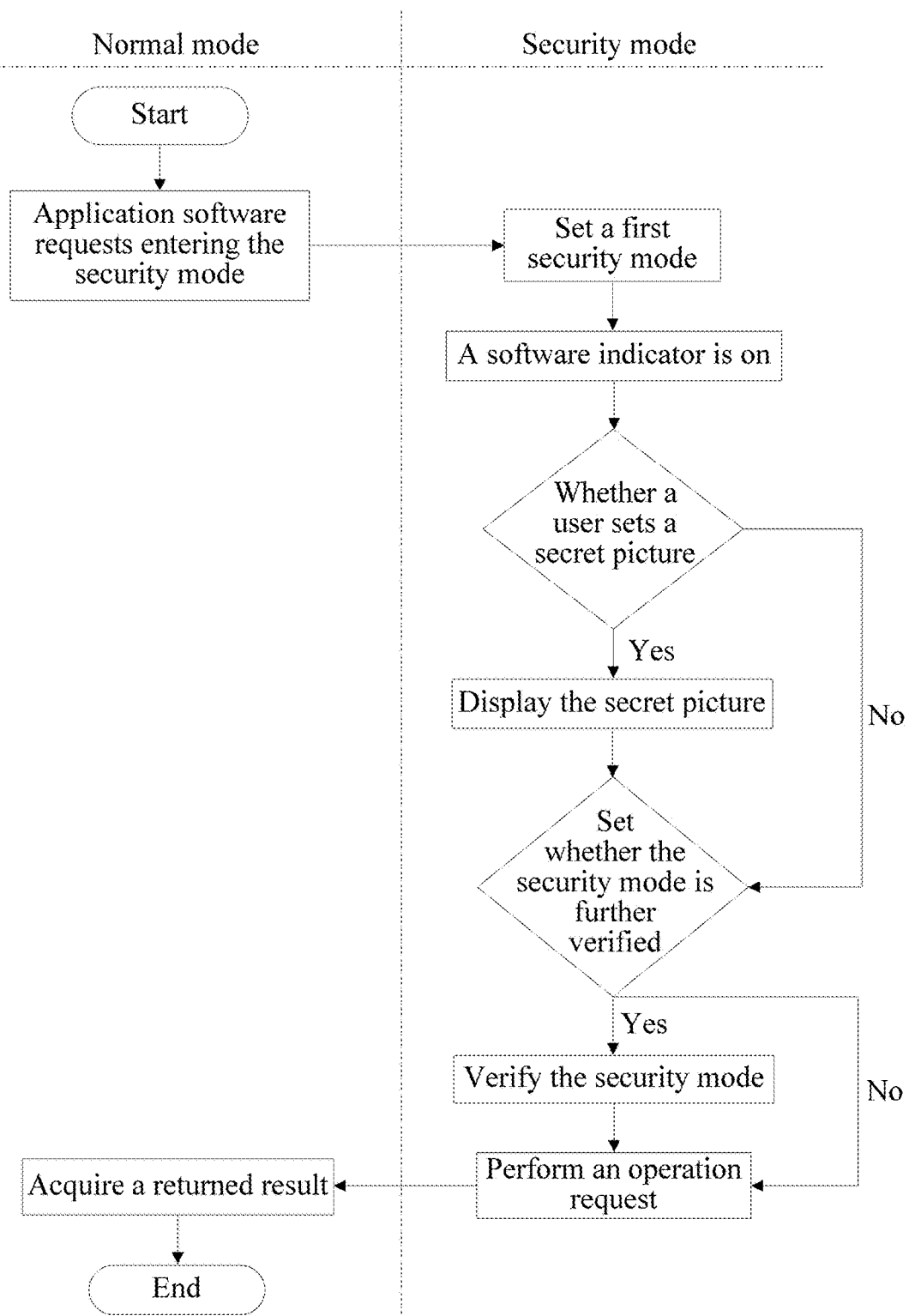
FIG. 14 is a schematic flowchart of a specific application scenario according to an embodiment of the present disclosure.

Refer to FIG. 14, which is a schematic flowchart of a specific application scenario according to an embodiment of the present disclosure. FIG. 10 is a diagram of an application scenario of a security mode according to this embodiment. Application software runs in a normal mode. When the application software requests entering the security mode, a local terminal first switches to a first security mode, and performs first secure environment setting, a software indicator in a status bar is on, and the local terminal is verified by a user. A first verification factor is that, when the user sets a secret picture, the secret picture is displayed. After the secret picture is displayed, whether a second verification factor is set is determined, that is, whether further verification of the security mode is set is determined. If the user does not set the secret picture, whether the second verification factor is set is directly determined, that is, whether further verification of the security mode is set is determined.

In the second verification factor, if the user sets further verification of the security mode, the user may use any one or several of verification methods in this embodiment for verification, and the local terminal is controlled to enter a second security mode. In the second security mode, the local terminal performs an operation request, for example, entering a password, or confirming payment, then acquires a returned result, and goes back to the normal mode. In the second verification factor, if the user does not set further verification of the security mode, the local terminal may directly perform the operation request, for example, entering a password, or confirming payment, and then acquire a returned result, and go back to the normal mode.

Specific implementation of a security mode prompt apparatus provided in the embodiments of the present disclosure is described below with reference to FIG. 15 to FIG. 22.

Figure 15:
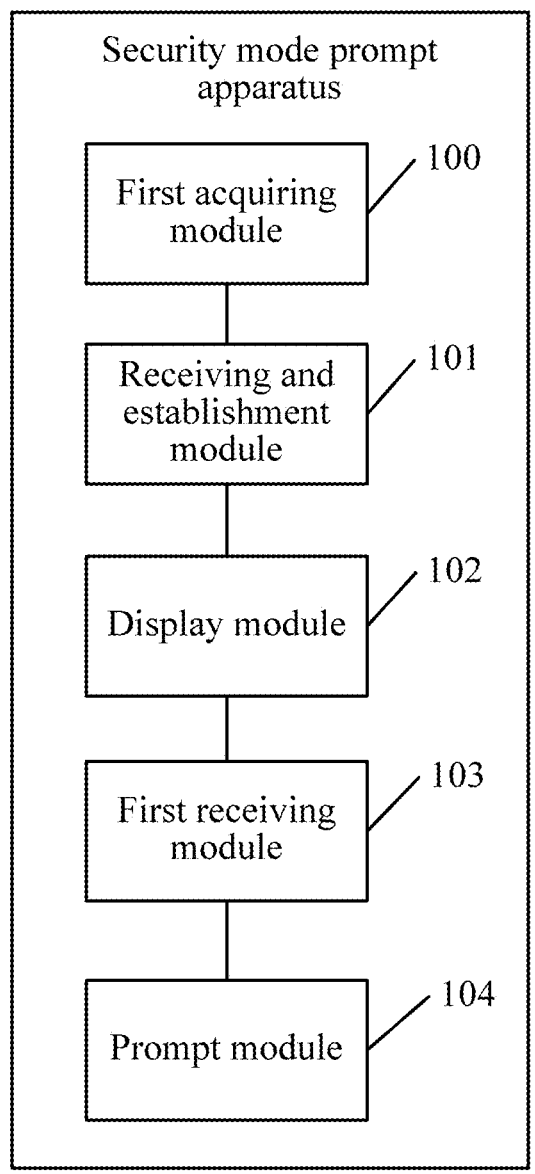
FIG. 15 is a schematic structural diagram of a security mode prompt apparatus according to an embodiment of the present disclosure.

Refer to FIG. 15, which is a schematic structural diagram of a security mode prompt apparatus according to an embodiment of the present disclosure. As shown in FIG. 15, the security mode prompt apparatus according to this embodiment includes a first acquiring module 100, a receiving and establishment module 101, a display module 102, a first receiving module 103, and a prompt module 104.

The first acquiring module 100 is configured to when determining that the apparatus is currently in a first security mode, acquire prestored first security information.

In an embodiment, the first security information may be information stored in secure storage, and the secure storage is storage space that can be accessed only in a security mode. Therefore, when a local terminal is in the first security mode, the first security information stored in the secure storage may be accessed. Therefore, the first security information may indicate that the local terminal is currently in the security mode. When it is determined that the local terminal is currently in the first security mode, the first acquiring module 100 reads the prestored first security information from the secure storage. It should be noted that, the first security information may be information in any form, for example, may be a character password or the like.

Further, when it is determined that the local terminal is currently in the first security mode, a screen of the terminal displays a security indicator, so as to prompt a user that the local terminal is in the first security mode, and the user may verify whether the local terminal is in a second security mode. Herein, description is made by using a mobile phone as an example. As shown in FIG. 2, when the local terminal switches to the first security mode, a security indicator is displayed in a status bar on a screen of the mobile phone, which is shown on the first mobile phone screen in FIG. 2. Because the status bar may generally be displayed in all software, and is easily forged by malicious software, the user needs to further verify a security indicator in a software form, that is, verify whether the local terminal is in the second security mode. It should be noted that, when the local terminal is in the second security mode, the user may perform related key operations, for example, entering a payment password or the like. After seeing the security indicator, the user pulls down the status bar, the screen of the mobile phone displays a secret picture, as shown on the second mobile phone screen in FIG. 2, and the secret picture is a secret picture stored in the secure storage. Because the secret picture may be stolen by an intentional attacker through image shooting, even though the secret picture seen by the user is the secret picture stored in the secure storage, the user also cannot determine that the terminal is currently in the second security mode. Therefore, further verification is needed, and first verification information is entered. As shown in FIG. 2, the secret picture is tapped to perform further verification, and the first verification information is entered for verification. When it is detected that the user taps the secret picture, the mobile phone acquires the prestored first security information from the secure storage, and further verifies whether the local terminal is in the second security mode, so as to prompt the user that the mobile phone is currently in the second security mode, to perform key operations, for example, enter a password or the like.

The receiving and establishment module 101 is configured to receive the first verification information entered by the user, and establish a first correspondence between the first security information and the first verification information.

In an embodiment, a method for directly displaying the first security information in the secure storage to the user is not secure, for example, a purposeful attacker may obtain the first security information in another manner such as image shooting or peeking, forge the first security information, and embed the first security information into malicious software. When needing to switch to the second security mode, the local terminal is prevented from switching to the second security mode, and the forged first security information is displayed, which makes the user mistakenly consider that the local terminal is currently in the second security mode and perform key operations. Therefore, the method is not secure. In this embodiment of the present disclosure, the receiving and establishment module 101 receives the first verification information entered by the user, and establishes the first correspondence between the first security information and the first verification information. It should be noted that, the first correspondence may exist in a form of a comparison table.

For example, if the prestored first security information is English letters "ABC", and the first verification information entered by the user is "356", establishing the first correspondence between the first security information and the first verification information may be establishing a correspondence between the letter "A" and the number "3", establishing a correspondence between the letter "B" and the number "5", and establishing a correspondence between the letter "C" and the number "6".

The display module 102 is configured to display confusion information, the first security information, and the first verification information on a screen for the user to select.

In an embodiment, the confusion information may be any information of a type same as that of the first security information or the first verification information, that is, the first security information is hidden in the confusion information. A manner of displaying the confusion information by the display module 102 is determined according to a manner of displaying the first security information and a manner of displaying the first verification information.

If the prestored first security information is English letters "ABC", the first verification information entered by the user is "356", and the display module 102 individually displays the numbers, the confusion information may be at least one in the 26 English letters after the letters in the first security information are removed and/or at least one in the 10 numeric characters after the characters in the first verification information are removed. During selection, the user may successively select, in all the displayed characters, the characters in the first security information and the characters in the first verification information, and the successive selection may indicate the correspondence between the first security information and the first verification information.

If the prestored first security information is English letters "ABC", and the first verification information entered by the user is "356", when the display module 102 displays the English letters and numbers by using the first correspondence, the confusion information may also be displayed by using a second correspondence, and the first correspondence and the second correspondence may be displayed on the screen in a disorderly arrangement manner. It should be noted that, the second correspondence is a confusion correspondence, that is, correspondence may randomly be performed in the second correspondence. Moreover, the first correspondence differs from the second correspondence. After the first correspondence and the second correspondence are displayed on the screen, the user may perform verification in all the correspondences, for example, the user may tap, on the screen, an option of a correct correspondence between the first security information and the entered first verification information. The user may also select an option of the second correspondence, and a specific selection method may be performing selection according to a preset rule.

The first receiving module 103 is configured to receive a selection result of the user, and determine, according to the first correspondence, whether the selection result of the user meets a preset rule.

In an embodiment, the first receiving module 103 of the terminal receives the selection result of the user, and determines, according to the first correspondence, whether the selection result of the user meets the preset rule.

Herein, description is continued by using examples. If the prestored first security information is English letters "ABC", the first verification information entered by the user is "356", and the numbers are individually displayed, during selection, the user may successively select, in all the displayed characters, the characters in the first security information and characters in the first verification information, and the first receiving module 103 determines whether a selection sequence of the user is "ABC356". If yes, it is determined that the selected characters conform to the first correspondence, that is, meet the preset rule; if not, it is determined that the selected characters do not conform to the first correspondence, that is, do not meet the preset rule.

If the prestored first security information is English letters "ABC", and the first verification information entered by the user is "356", when the English letters and numbers are displayed by using the first correspondence, the confusion information may also be displayed by using the second correspondence. The preset rule is that the user selects an option of the first correspondence. During selection of the user, if the selected option completely matches the first correspondence, the first receiving module 103 determines that a selection result of the user meets the preset rule; if the selected option does not completely match the first correspondence, the first receiving module 103 determines that the selection result of the user does not meet the preset rule. Further, if the preset rule is that the user selects the option of the second correspondence, during selection of the user, if the selected option completely matches the second correspondence, the first receiving module 103 determines that the selection result of the user meets the preset rule; if the selected option does not completely match the second correspondence, the first receiving module 103 determines that the selection result of the user does not meet the preset rule.

The prompt module 104 is configured to when the selection result of the user meets the preset rule, prompt the user that the terminal is in the second security mode.

In an embodiment, when the selection result generated by tapping by the user meets the preset rule, the prompt module 104 prompts the user that the terminal is in the second security mode, and in the second security mode, the user may perform key operations, such as performing payment or entering a password.

In this embodiment of the present disclosure, when it is determined that a local terminal is in a first security mode, prestored first security information is acquired; first verification information entered by a user is received, and a first correspondence between the first security information and the first verification information is established; confusion information, the first security information, and the first verification information are displayed on a screen for the user to select; after selection of the user, a selection result of the user is received, and whether the selection result of the user meets a preset rule is determined according to the first correspondence; and when the selection result of the user meets the preset rule, the user is prompted that the terminal is in a second security mode. In this embodiment of the present disclosure, the prestored first security information is not directly output, but the first correspondence between the first security information and the first verification information is established, the confusion information, the first security information, and the first verification information are displayed on the screen for the user to perform verification and selection, and whether the selection result of the user meets the preset rule is determined according to the first correspondence, so as to prompt the user that the terminal is in the second security mode. Therefore, in this manner, the first security information cannot be obtained in another manner such as peeking or image shooting. Therefore, the security mode prompt method is highly secure and practical.

Figure 16:
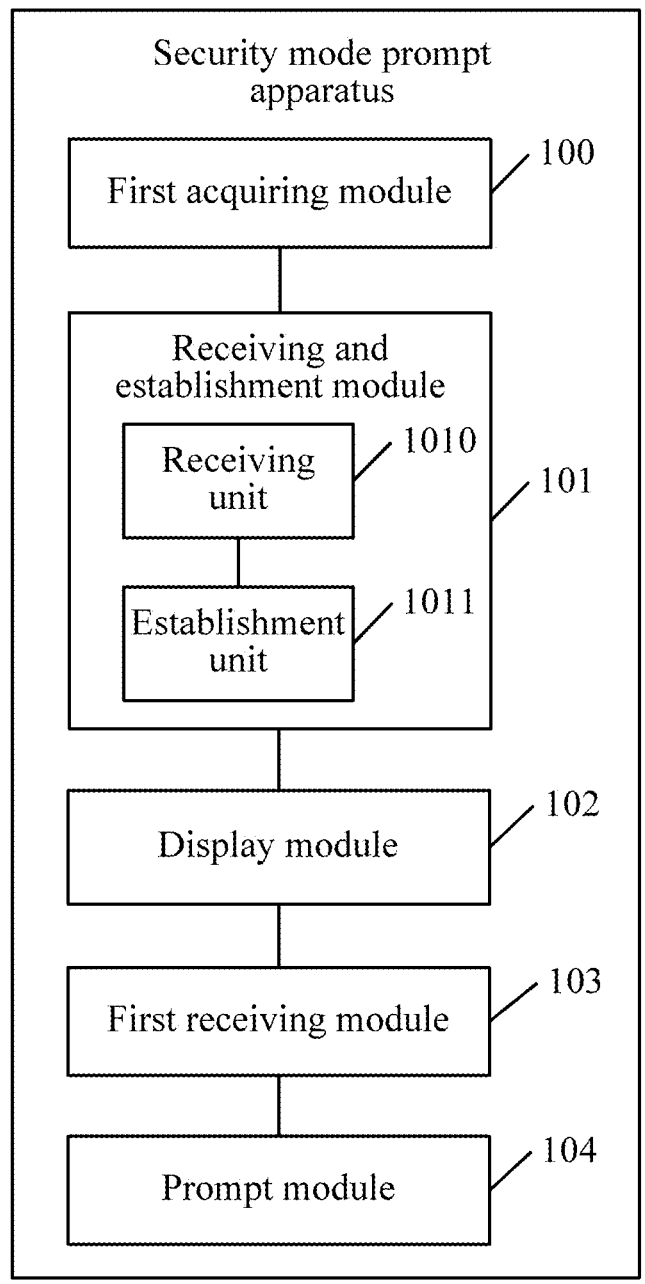
FIG. 16 is a schematic structural diagram of another security mode prompt apparatus according to an embodiment of the present disclosure.

Refer to FIG. 16, which is a schematic structural diagram of another security mode prompt apparatus according to an embodiment of the present disclosure. As shown in FIG. 16, the another security mode prompt apparatus according to this embodiment includes all the modules in the apparatus shown in FIG. 15. For the descriptions of the first acquiring module 100, the receiving and establishment module 101, the display module 102, the first receiving module 103, and the prompt module 104, refer to FIG. 16, and details are not described herein again. Further, the receiving and establishment module 101 in this embodiment of the present disclosure may further include a receiving unit 1010 and an establishment unit 1011.

The receiving unit 1010 is configured to receive first verification information entered by a user.

As an optional implementation manner, in a specific application scenario, when an application interface of an application program needs to invoke a second security mode, the terminal first enters a first security mode. For example, as shown in FIG. 4, on the first screen interface, when an application program needs to invoke an interface on which a user enters a password to log in, a security indicator is simulated in a status bar of a screen, to prompt the user that the local terminal is currently in the first security mode. However, because it is very easy to forge the software indicator, the user needs to perform further verification. The user pulls down the status bar, as shown in the second screen in FIG. 4, the screen displays a secret picture, and the secret picture is a picture stored in secure storage of the local terminal. When the local terminal switches to the first security mode, the secret picture in the secure storage is read and displayed, so as to prompt the user that the local terminal is currently in the first security mode. Because the secret picture may be obtained by an attacker by peeking or image shooting purposefully, when seeing the secret picture, the user further needs to verify whether the local terminal is currently in the second security mode. Therefore, the user taps the secret picture, and when the local terminal detects that the user taps the secret picture, the third interface in FIG. 4 is displayed, and a numerical keypad appears in a system, to prompt the user to enter the first verification information. When the user enters the first verification information, the receiving unit 1010 receives the first verification information entered by the user. It should be noted that, the characters entered by the user need to be masked, are indicated by using symbols "*", and are not directly displayed in the screen, and the characters entered by the user are random characters.

Further, the characters included in the first security information may be characters of a first type, and characters included in the first verification information entered by the user may be characters of a second type. It should be noted that, characters of the first type may be English characters (26 English letters), or may be numeric characters (numeric characters which are 0 to 9), or other characters. The receiving unit 1010 receives the first verification information entered by the user, the characters included in the first verification information may be characters of the second type, and characters of the first type differ from characters of the second type. For example, if characters of the first type are English characters, characters of the second type are numeric characters; if characters of the first type are numeric characters, characters of the second type are English characters. It should be noted that, a quantity of digits of the characters in the first security information may be the same as a quantity of digits of the characters in the first verification information.

The establishment unit 1011 is configured to establish a one-to-one correspondence between characters in the first security information and characters in the first verification information, and set the one-to-one correspondence as the first correspondence.

As an optional implementation manner, the establishment unit 1011 establishes the one-to-one correspondence between the characters in the first security information and the characters in the first verification information, and sets the one-to-one correspondence as the first correspondence.

The establishment unit 1011 successively sets the first correspondence between the characters included in the first security information and the characters included in the first verification information, and the characters in the first security information are in one-to-one correspondence with the characters in the first verification information. Herein, description is made by using an example in which the first security information is "PATEN". When the first verification information entered by the user is "18074", the first correspondences are P-1, A-8, T-0, E-7, and N-4. It should be noted that, if there are repeated letters, a correspondence is subjected to a correspondence of the first letter of the repeated letters, for example, if first character information is "PATENT", the last T corresponds to 0.

In this embodiment of the present disclosure, when it is determined that a local terminal is in a first security mode, prestored first security information is acquired; first verification information entered by a user is received, and a first correspondence between the first security information and the first verification information is established; confusion information, the first security information, and the first verification information are displayed on a screen for the user to select; after selection of the user, a selection result of the user is received, and whether the selection result of the user meets a preset rule is determined according to the first correspondence; and when the selection result of the user meets the preset rule, the user is prompted that the terminal is in a second security mode. In this embodiment of the present disclosure, the prestored first security information is not directly output, but the first correspondence between the first security information and the first verification information is established, the confusion information, the first security information, and the first verification information are displayed on the screen for the user to perform verification and selection, and whether the selection result of the user meets the preset rule is determined according to the first correspondence, so as to prompt the user that the terminal is in the second security mode. Therefore, in this manner, the first security information cannot be obtained in another manner such as peeking or image shooting. Therefore, the security mode prompt method is highly secure and practical.

Figure 17:
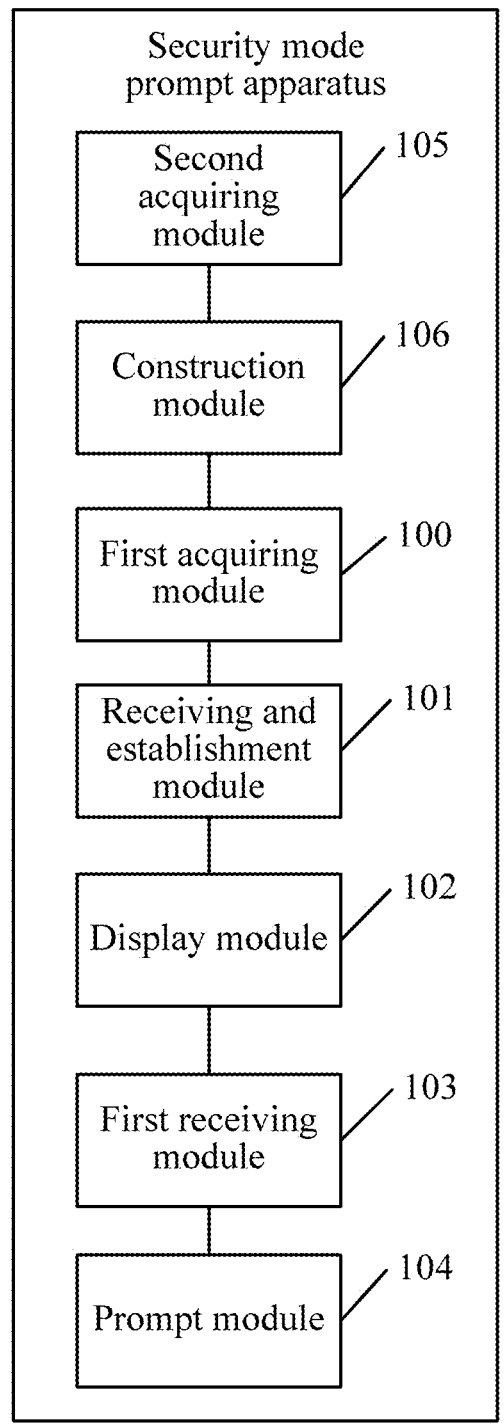
FIG. 17 is a schematic structural diagram of still another security mode prompt apparatus according to an embodiment of the present disclosure.

Refer to FIG. 17, which is a schematic structural diagram of still another security mode prompt apparatus according to an embodiment of the present disclosure. As shown in FIG. 17, the still another security mode prompt apparatus according to this embodiment includes all the modules in the apparatus shown in FIG. 15. For the descriptions of the first acquiring module 100, the receiving and establishment module 101, the display module 102, the first receiving module 103, and the prompt module 104, refer to FIG. 16, and details are not described herein again. In addition, the security mode prompt apparatus in this embodiment of the present disclosure may further include a second acquiring module 105 or a construction module 106.

The second acquiring module 105 is configured to acquire prestored confusion information.

As an optional implementation manner, a second correspondence may be prestored, that is, preset. When the second correspondence is needed, the second acquiring module 105 directly acquires the prestored second correspondence.

The construction module 106 is configured to construct confusion information according to first security information and/or first verification information.

As an optional implementation manner, the confusion information may also be constructed by the construction module 106 according to the first security information and/or the first verification information. A manner of constructing the confusion information needs to be determined according to a preset rule. For example, if the prestored first security information is English letters "ABC", the first verification information entered by the user is "356", and the numbers are individually displayed, and when performing verification, the user also successively enters the first security information and the first verification information, the confusion information may be at least one in the 26 English letters except the letters "ABC", or may be at least one in the 10 numeric characters except "356", or may be a combination thereof. Further, if the prestored first security information is English letters "ABC", the first verification information entered by the user is "356", the English letters and numbers are displayed by using the first correspondence, and the user performs selection according to the first correspondence, the confusion information may be a second correspondence. Herein, construction of the second correspondence by the construction module 106 is described in detail.

Herein, description is continued by using an example in which the second correspondence is constructed in a mobile phone, and it is assumed that the second correspondence is a correspondence between first character information and second character information. Characters included in the first character information and the characters included in the first security information are different, but are all characters of the first type. Herein, description is continued by using an example in which characters of the first type are English characters, and the characters included in the first character information may be all remaining characters in the English alphabet except the characters in the first security information, or may be some remaining characters in the English alphabet except the characters in the first security information. Herein, description is continued by using an example in which the first character information is "PATEN", and the first character information may be "BCDFG", or may be all remaining characters in the 26 English characters except "PATEN". A second correspondence between each character in the first character information and a character in the second character information is set, and the second correspondence is also a one-to-one correspondence. It should be noted that, the characters included in the second character information may be characters of the second type, that is, any character between 0 and 9. For example, it may be set that a character B corresponds to a character 4, and a character C corresponds to a character 0.

Further, the display module 102 is configured to display the confusion information, the first security information, and the first verification information on a screen for the user to select.

After the confusion information is acquired or constructed, the display module 102 needs to display the confusion information, the first security information, and the first verification information on the screen for the user to select. A specific display manner may be individually displayed, or may be displayed in a correspondence manner. Herein, description is continued by using an example in which displaying is performed in the correspondence manner.

After both the first correspondence and the second correspondence are set, the display module 102 displays the second correspondence and the first correspondence on the screen for the user to perform verification. A specific display manner may be that the display module 102 establishes a comparison table including the first correspondence and the second correspondence, that is, establishes a comparison table including a correspondence between a character of the first type and a character of the second type, so that the user can perform verification according to the comparison table.

FIG. 5 is a comparison table of the first correspondence and the second correspondence. The first character information "PATEN" corresponds to characters "18074", and the second correspondence is that all English characters in the 26 English characters except the characters "PATEN" are randomly in one-to-one correspondence with 0 to 9, for example, B corresponds to 4, and H corresponds to 0. The user may perform verification on the screen. FIG. 6 shows a screen interface on which a terminal outputs a comparison table. The comparison table displayed on the interface is the comparison table shown in FIG. 5. The user may verify in the comparison table whether a correspondence between the characters included in the first security information and the characters included in the first verification information entered by the user is correct, and if the correspondence is correct, the user taps a corresponding option. It should be noted that, the user may also tap an option of the second correspondence. A specific selection manner needs to be determined according to a preset rule.

Herein, description is continued by using verification in the terminal as an example. As shown in FIG. 6, the first security information is "PATEN", the first verification information is "18074", and the user finds that "PATEN" are correctly in one-to-one correspondence with "18074" on the screen, a corresponding option is checked for verification.

Further, the first receiving module 103 receives a selection result of the user, and determines, according to the first correspondence, whether the selection result of the user meets a preset rule.

The first receiving module 103 receives the selection result of the user, and determines, according to the first correspondence, whether the selection result of the user meets the preset rule. A determining manner may be determined according to a display manner and the preset rule. Herein, description is continued by using an example in which the display manner is performing displaying by using a correspondence.

When the selection result of the user completely matches the first correspondence or the selection result of the user completely matches the second correspondence, the first receiving module 103 determines that the selection result of the user meets the preset rule. In this implementation manner, the first security information stored in the secure storage of the local terminal is not displayed on the screen individually and directly, but hidden in the comparison table according to a corresponding rule. The user may verify according to the comparison table that the local terminal is in a second security mode.

Further, when the selection result of the user meets the preset rule, the prompt module 104 prompts the user that the terminal is in the second security mode.

When the selection result of the user meets the preset rule, the prompt module 104 prompts the user that the terminal is in the second security mode, and in the second security mode, the user may perform key operations, such as performing payment or entering a password.

In this embodiment of the present disclosure, when it is determined that a local terminal is in a first security mode, prestored first security information is acquired; first verification information entered by a user is received, and a first correspondence between the first security information and the first verification information is established; confusion information, the first security information, and the first verification information are displayed on a screen for the user to select; after selection of the user, a selection result of the user is received, and whether the selection result of the user meets a preset rule is determined according to the first correspondence; and when the selection result of the user meets the preset rule, the user is prompted that the terminal is in a second security mode. In this embodiment of the present disclosure, the prestored first security information is not directly output, but the first correspondence between the first security information and the first verification information is established, the confusion information, the first security information, and the first verification information are displayed on the screen for the user to perform verification and selection, and whether the selection result of the user meets the preset rule is determined according to the first correspondence, so as to prompt the user that the terminal is in the second security mode. Therefore, in this manner, the first security information cannot be obtained in another manner such as peeking or image shooting. Therefore, the security mode prompt method is highly secure and practical.

Figure 18:
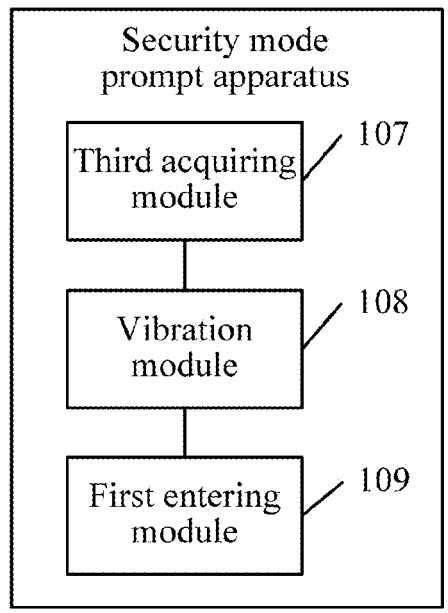
FIG. 18 is a schematic structural diagram of yet another security mode prompt apparatus according to an embodiment of the present disclosure.

Refer to FIG. 18, which is a schematic structural diagram of yet another security mode prompt apparatus according to an embodiment of the present disclosure. As shown in FIG. 18, the security mode prompt apparatus according to this embodiment includes a third acquiring module 107, a vibration module 108, and a first entering module 109.

The third acquiring module 107 is configured to when determining that the apparatus is currently in a first security mode, acquire a prestored quantity of times of vibration.

As an optional implementation manner, the first security information stored in secure storage is a natural number, and the natural number is a secret quantity, which is stored in the secure storage and is specified by a user when a device is initialized, of times of vibration. The secure storage can be accessed only in a security mode. When it is determined that a terminal is in the first security mode, the third acquiring module 107 acquires the prestored quantity of times of vibration.

The vibration module 108 is configured to perform, according to the quantity of times of vibration, vibration that matches the quantity of times of vibration.

As an optional implementation manner, the terminal reads the prestored quantity of times of vibration from the secure storage, the vibration module 107 controls vibration of the local terminal, and the quantity of times of vibration matches the read number of times of vibration. FIG. 8 shows a vibration screen interface when a local terminal vibrates. If the quantity of times of vibration perceived by the user is exactly the natural number prestored in the secure storage, a confirmation message is entered. If the quantity of times of vibration perceived by the user is not the natural number prestored in the secure storage, a confirmation failure message is entered. In this embodiment, a vibration manner enables the user to directly perform perceiving, and displaying is not needed, and therefore, the first security information stored in the secure storage also cannot be obtained in another manner such as peeking or image shooting. The security mode prompt manner has high security.

The first entering module 109 is configured to when the confirmation message of the user is received, enter a second security mode.

As an optional implementation manner, when the terminal receives the confirmation message of the user, the first entering module 109 controls the terminal to enter the second security mode, for example, an interface for entering a password pops up.

In this embodiment of the present disclosure, when it is determined that a terminal is currently in a first security mode, a prestored quantity of times of vibration is acquired; vibration that matches the quantity of times of vibration is performed according to the quantity of times of vibration; and a user performs confirmation according to the quantity of times of vibration, and when a confirmation message of the user is received, the terminal enters a second security mode. In this embodiment of the present disclosure, the prestored quantity of times of vibration is not directly output, but vibration that matches the quantity of times of vibration is performed, so that the user performs confirmation according to the quantity of times of vibration perceived by the user, and when receiving the confirmation message of the user, the terminal enters the second security mode again. Therefore, in this manner, the quantity of times of vibration cannot be obtained in another manner such as peeking or image shooting, and the security mode prompt method is highly secure and practical.

Figure 19:
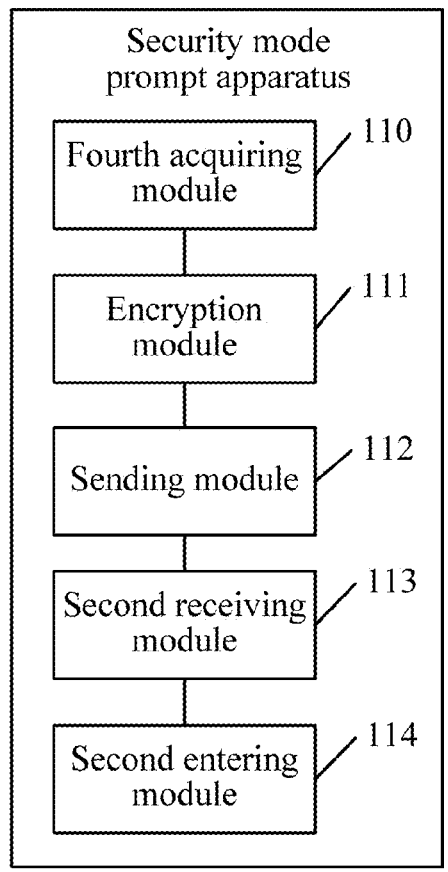
FIG. 19 is a schematic structural diagram of still yet another security mode prompt apparatus according to an embodiment of the present disclosure.

Refer to FIG. 19, which is a schematic structural diagram of still yet another security mode prompt apparatus according to an embodiment of the present disclosure. As shown in FIG. 19, the security mode prompt apparatus according to this embodiment includes a fourth acquiring module 110, an encryption module 111, a sending module 112, a second receiving module 113, and a second entering module 114.

The fourth acquiring module 110 is configured to when determining that a first apparatus is currently in a first security mode, acquire a prestored private key.

As an optional implementation manner, when it is determined that the first apparatus is currently in the first security mode, the fourth acquiring module 110 acquires the prestored private key. It should be noted that, the first security mode may be that, an indicator in a status bar of the first apparatus is on, and a secret picture is displayed.

The encryption module 111 is configured to encrypt preset information according to the private key, to obtain a ciphertext.

As an optional implementation manner, when first security information stored in secure storage is the private key, the preset information is acquired, and it is assumed that the preset information is M. The encryption module 111 performs a digital signature operation on the preset information by using the private key and a digital signature algorithm, so as to encrypt the preset information, to obtain the ciphertext, and it is assumed that the ciphertext is Sig(M). It should be noted that, when the first apparatus performs presetting, a key/public key pair may be generated, the key is in one-to-one correspondence with the public key, the generated key is stored in the secure storage of the first apparatus, and the public key is sent to a second apparatus. The preset information may be an APP name, a date, a time, a mobile phone identifier name, and the like. A process of performing a digital signature operation on the preset information by a terminal by using the private key is verifying whether the private key is a private key in the secure storage.

The sending module 112 is configured to send the ciphertext to the second apparatus, so that the second apparatus decrypts the ciphertext according to a public key corresponding to the private key, and sends feedback information according to a decryption result.

As an optional implementation manner, the sending module 112 of the first apparatus sends the obtained ciphertext to the second apparatus, and the second apparatus decrypts the ciphertext according to the public key corresponding to the private key, and sends the feedback information according to the decryption result. It should be noted that, the feedback information may include whether the second apparatus successfully decrypts the ciphertext.

Further, the second apparatus may be a watch, as shown in FIG. 10. Because less software is installed, and the second apparatus of this type is an auxiliary functional device of a mobile phone in most cases, an intrusion opportunity is low, and it may be assumed that the second apparatus is a trusted apparatus. Further, the first apparatus may be a mobile phone, the second apparatus may be a watch, the mobile phone may send the ciphertext to the watch by using BLUETOOTH or WIFI, and after the watch receives the ciphertext, the ciphertext is decrypted by using the public key corresponding to the private key. A specific decryption process may be that, herein, description is continued by using an example in which the preset information is M and the ciphertext is Sig(M), the watch decrypts the ciphertext by using a verification function such as Verify(M, Sig(M)) and the public key, and if Sig(M) is indeed used for encrypting the preset information M by using the private key in the secure storage, the function outputs a result 1, indicating that the decryption succeeds; otherwise, the function outputs 0, indicating that the decryption fails. Whether the decryption succeeds is encapsulated into feedback information, and the feedback information is sent to the first apparatus, so that the first apparatus is controlled to enter a second security mode. In this embodiment, whether the private key for performing encryption is the private key in the secure storage is verified mainly by using the public key.

Further, the sending module 112 may further be configured to convert the ciphertext into a two-dimensional code, and display the two-dimensional code on a screen, so that a second apparatus scans the two-dimensional code.

In order to send the ciphertext to the second apparatus, the sending module 112 may convert the ciphertext into the two-dimensional code and display the two-dimensional code on the screen, so that the second apparatus having a camera scans the two-dimensional code, to obtain the preset information.

The sending module 112 of the first apparatus displays, on the screen of the first apparatus, the two-dimensional code obtained by converting, and in order to verify whether a local terminal is currently in the second security mode, the user may scan the two-dimensional code by using the second apparatus having a camera, for example, scan the two-dimensional code by using sun glasses. As shown in FIG. 12, a camera is set on a frame of sun glasses, and when the screen of the first apparatus displays a two-dimensional code, the two-dimensional code is scanned by using the camera.

Further, the second apparatus converts the scanned two-dimensional code into the ciphertext, and decrypts the ciphertext by using the public key corresponding to the private key. A specific decryption process may be that, herein, description is continued by using an example in which original information is M and the ciphertext is Sig (M), the second apparatus, that is, sun glasses, decrypts the ciphertext by using a verification function such as Verify(M, Sig(M)) and the public key, and if Sig(M) is indeed used for encrypting the preset information M by using the private key in the secure storage, the function outputs a result 1, indicating that the decryption succeeds; otherwise, the function outputs 0, indicating that the decryption fails. In this embodiment, whether the private key for performing encryption is the private key in the secure storage is verified mainly by using the public key. Further, the second apparatus may send the feedback information to the first apparatus according to whether the decryption succeeds.

The second receiving module 113 is configured to receive the feedback information sent by the second apparatus.

As an optional implementation manner, the second receiving module 113 of the first apparatus receives the feedback information sent by the second apparatus, and parses the received feedback information.

The second entering module 114 is configured to when determining according to the feedback information that the decryption succeeds, enter a second security mode.

As an optional implementation manner, when it is determined according to the feedback information received by the first apparatus that the decryption succeeds, the second entering module 114 of the first apparatus controls the first apparatus to enter the second security mode, and the second security mode may be a mode in which the user enters a payment password.

Further, when the first apparatus enters the second security mode, the user may be notified in a screen display manner or vibration manner that the local terminal is in the second security mode.

In this embodiment of the present disclosure, when it is determined that a first terminal is currently in a first security mode, a prestored private key is acquired; preset information is encrypted according to the acquired private key, to obtain a ciphertext; the ciphertext is sent to a second terminal, so that the second terminal decrypts the ciphertext according to a public key corresponding to the private key, and sends feedback information according to a decryption result; and when the first terminal receives the feedback information sent by the second terminal, and it is confirmed according to the feedback information that the decryption succeeds, the first terminal enters a second security mode. In this embodiment of the present disclosure, the prestored private key is not directly output, but the preset information is encrypted by using the private key, to obtain the ciphertext, the ciphertext is sent to the second terminal for verification, and when successfully decrypting the ciphertext by using the public key corresponding to the private key, the second terminal enters the second security mode. Therefore, in this manner, the private key cannot be obtained in another manner such as peeking or image shooting, and the security mode prompt method is highly secure and practical.

Figure 20:
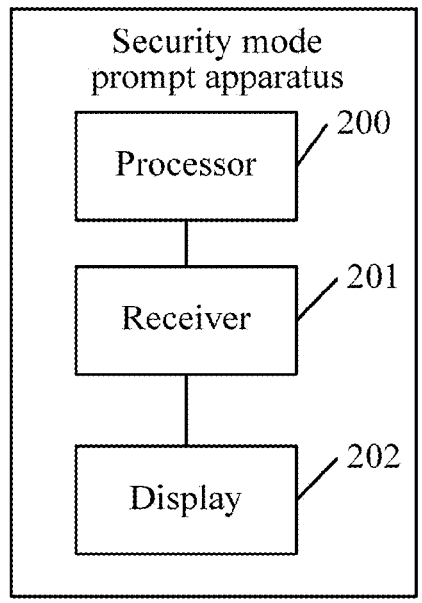
FIG. 20 is a schematic structural diagram of a further security mode prompt apparatus according to an embodiment of the present disclosure.

FIG. 20 is a schematic structural diagram of a further security mode prompt apparatus according to an embodiment of the present disclosure. As shown in FIG. 20, the security mode prompt apparatus provided in this embodiment of the present disclosure includes a processor 200, a receiver 201, and a display 202.

The processor 200 is configured to when determining that a terminal is currently in a first security mode, acquire prestored first security information.

The receiver 201 is configured to receive first verification information entered by a user, and establish a first correspondence between the first security information and the first verification information.

The display 202 is configured to display confusion information, the first security information, and the first verification information on a screen for the user to select.

The receiver 201 is further configured to receive a selection result of the user, and determine, according to the first correspondence, whether the selection result of the user meets a preset rule.

The processor 200 is further configured to: when the selection result of the user meets the preset rule, prompt the user that the terminal is in a second security mode.

Optionally, the first security information may be information stored in secure storage, and the secure storage is storage space that can be accessed only in a security mode. Therefore, when a local terminal is in the first security mode, the first security information stored in the secure storage may be accessed. Therefore, the first security information may indicate that the local terminal is currently in the security mode. When it is determined that the local terminal is currently in the first security mode, the prestored first security information is read from the secure storage. It should be noted that, the first security information may be information in any form, for example, may be a character password or the like.

Further, when it is determined that the local terminal is currently in the first security mode, a screen of the terminal displays a security indicator, so as to prompt the user that the local terminal is in the first security mode, and the user may verify whether the local terminal is in the second security mode. Herein, description is made by using a mobile phone as an example. As shown in FIG. 2, when the local terminal switches to the first security mode, a security indicator is displayed in a status bar on a screen of the mobile phone, which is shown on the first mobile phone screen in FIG. 2. Because the status bar may generally be displayed in all software, and is easily forged by malicious software, the user needs to further verify a security indicator in a software form, that is, verify whether the local terminal is in the second security mode. It should be noted that, when the local terminal is in the second security mode, the user may perform related key operations, for example, entering a payment password or the like. After seeing the security indicator, the user pulls down the status bar, the screen of the mobile phone displays a secret picture, as shown on the second mobile phone screen in FIG. 2, and the secret picture is a secret picture stored in the secure storage. Because the secret picture may be stolen by an intentional attacker through image shooting, even though the secret picture seen by the user is the secret picture stored in the secure storage, the user also cannot determine that the terminal is currently in the second security mode. Therefore, further verification is needed, and first verification information is entered. As shown in FIG. 2, the secret picture is tapped to perform further verification, and the first verification information is entered for verification. When it is detected that the user taps the secret picture, the mobile phone acquires the prestored first security information from the secure storage, and further verifies whether the local terminal is in the second security mode, so as to prompt the user that the mobile phone is currently in the second security mode, to perform key operations, for example, enter a password or the like.

Optionally, a method for directly displaying the first security information in the secure storage to the user is not secure, for example, a purposeful attacker may obtain the first security information in another manner such as image shooting or peeking, forge the first security information, and embed the first security information into malicious software. When needing to switch to the second security mode, the local terminal is prevented from switching to the second security mode, and the forged first security information is displayed, which makes the user mistakenly consider that the local terminal is currently in the second security mode and perform key operations. Therefore, the method is not secure. In this embodiment of the present disclosure, the first verification information entered by the user is received, and the first correspondence between the first security information and the first verification information is established. It should be noted that, the first correspondence may exist in a form of a comparison table. For example, if the prestored first security information is English letters "ABC", and the first verification information entered by the user is "356", establishing the first correspondence between the first security information and the first verification information may be establishing a correspondence between the letter "A" and the number "3", establishing a correspondence between the letter "B" and the number "5", and establishing a correspondence between the letter "C" and the number "6".

Optionally, the confusion information may be any information of a type the same as that of the first security information or the first verification information, that is, the first security information is hidden in the confusion information. A manner of displaying the confusion information is determined according to a manner of displaying the first security information and a manner of displaying the first verification information.

If the prestored first security information is English letters "ABC", the first verification information entered by the user is "356", and the numbers are individually displayed, the confusion information may be at least one in the 26 English letters after the letters in the first security information are removed and/or at least one in the 10 numeric characters after the characters in the first verification information are removed. During selection, the user may successively select, in all the displayed characters, the characters in the first security information and the characters in the first verification information, and the successive selection may indicate the correspondence between the first security information and the first verification information.

If the prestored first security information is English letters "ABC", and the first verification information entered by the user is "356", when the English letters and numbers are displayed by using the first correspondence, the confusion information may also be displayed by using a second correspondence, and the first correspondence and the second correspondence may be displayed on the screen in a disorderly arrangement manner. It should be noted that, the second correspondence is a confusion correspondence, that is, corresponding may randomly be performed in the second correspondence. Moreover, the first correspondence differs from the second correspondence. After the first correspondence and the second correspondence are displayed on the screen, the user may perform verification in all the correspondences, for example, the user may tap, on the screen, an option of a correct correspondence between the first security information and the entered first verification information. The user may also select an option of the second correspondence, and a specific selection method may be performing selection according to a preset rule.

Optionally, the terminal receives the selection result of the user, and determines, according to the first correspondence, whether the selection result of the user meets the preset rule.

Herein, description is continued by using examples. If the prestored first security information is English letters "ABC", the first verification information entered by the user is "356", and the numbers are individually displayed, during selection, the user also successively selects, in all the displayed characters, the characters in the first security information and the characters in the first verification information, and whether a selection sequence of the user is "ABC356" is determined. If yes, it is determined that the selected characters conform to the first correspondence, that is, meet the preset rule; if not, it is determined that the selected characters do not conform to the first correspondence, that is, do not meet the preset rule.

If the prestored first security information is English letters "ABC", and the first verification information entered by the user is "356", when the English letters and numbers are displayed by using the first correspondence, the confusion information may also be displayed by using the second correspondence. The preset rule is that the user selects an option of the first correspondence. During selection of the user, if the selected option completely matches the first correspondence, the selection result of the user meets the preset rule; if the selected option does not completely match the first correspondence, the selection result of the user does not meet the preset rule. Further, if the preset rule is that the user selects the option of the second correspondence, during selection of the user, if the selected option completely matches the second correspondence, the selection result of the user meets the preset rule; if the selected option does not completely match the second correspondence, the selection result of the user does not meet the preset rule.

Optionally, when the selection result generated by tapping by the user meets the preset rule, the user is prompted that the terminal is in the second security mode, and in the second security mode, the user may perform key operations, such as performing payment or entering a password.

The first security information includes at least two characters, the first verification information includes at least two characters, and a length of the first security information is equal to a length of the first verification information.

The processor is further configured to establish a one-to-one correspondence between the characters in the first security information and the characters in the first verification information, and set the one-to-one correspondence as the first correspondence.

Optionally, the characters included in the first security information may be characters of a first type, and the characters included in the first verification information entered by the user may be characters of a second type. It should be noted that, characters of the first type may be English characters (26 English letters), or may be numeric characters (numeric characters which are 0 to 9), or other characters. The first verification information entered by the user is received, the characters included in the first verification information may be characters of the second type, and characters of the first type differ from characters of the second type. For example, if characters of the first type are English characters, characters of the second type are numeric characters; if characters of the first type are numeric characters, characters of the second type are English characters. It should be noted that, a quantity of digits of the characters in the first security information may be the same as a quantity of digits of the characters in the first verification information. The one-to-one correspondence between the characters in the first security information and the characters in the first verification information is established, and the one-to-one correspondence is set as the first correspondence.

In a specific application scenario, when an application interface of an application program needs to invoke the second security mode, the terminal first enters the first security mode. For example, as shown in FIG. 4, on the first screen interface, when an application program needs to invoke an interface on which a user enters a password to log in, a security indicator is simulated in a status bar of a screen, to prompt the user that the local terminal is currently in the first security mode. However, because it is very easy to forge the software indicator, the user needs to perform further verification. The user pulls down the status bar, as shown in the second screen in FIG. 4, the screen displays a secret picture, and the secret picture is a picture stored in the secure storage of the local terminal. When the local terminal switches to the first security mode, the secret picture in the secure storage is read and displayed, so as to prompt the user that the local terminal is currently in the first security mode. Because the secret picture may be obtained by an attacker by peeking or image shooting purposefully, when seeing the secret picture, the user further needs to verify whether the local terminal is currently in the second security mode. Therefore, the user taps the secret picture, and when the local terminal detects that the user taps the secret picture, the third interface in FIG. 4 is displayed, and a numerical keypad appears in a system, to prompt the user to enter the first verification information. When the user enters the first verification information, the first verification information entered by the user is received, and the characters included in the first verification information are characters of the second type. Herein, description is made by using an example in which characters of the first type are English characters, and characters of the second type are numeric characters. The local terminal receives the numeric characters entered by the user. It should be noted that, the characters entered by the user need to be masked, are indicated by using symbols "*", and are not directly displayed in the screen, and the characters entered by the user are random characters.

First correspondences between the characters included in the first security information and the characters included in the first verification information are successively set, and the characters in the first security information are in one-to-one correspondence with the characters in the first verification information. Herein, description is made by using an example in which the first security information is "PATEN". When the first verification information entered by the user is "18074", the first correspondences are P-1, A-8, T-0, E-7, and N-4. It should be noted that, if there are repeated letters, a correspondence is subjected to a correspondence of the first letter of the repeated letters, for example, if first character information is "PATENT", the last T corresponds to 0.

The processor is further configured to acquire prestored confusion information, or the processor is further configured to construct the confusion information according to the first security information and/or the first verification information.

Optionally, the confusion information may be prestored, that is, preset. When the confusion information is needed, the prestored confusion information is directly acquired. The confusion information may also be constructed according to the first security information and/or the first verification information. A manner of constructing the confusion information needs to be determined according to a preset rule. For example, if the prestored first security information is English letters "ABC", the first verification information entered by the user is "356", and the numbers are individually displayed, and when performing verification, the user also successively enters the first security information and the first verification information, the confusion information may be at least one in the 26 English letters except the letters "ABC", or may be at least one in the 10 numeric characters except "356", or may be a combination thereof. Further, if the prestored first security information is English letters "ABC", the first verification information entered by the user is "356", the English letters and numbers are displayed by using the first correspondence, and the user performs selection according to the first correspondence, the confusion information may be the second correspondence. Herein, constructing the second correspondence is described in detail.

Herein, description is continued by using an example in which the second correspondence is constructed in a mobile phone, and it is assumed that the second correspondence is a correspondence between the first character information and the second character information. Characters included in the first character information and the characters included in the first security information are different, but are all characters of the first type. Herein, description is continued by using an example in which characters of the first type are English characters, and the characters included in the first character information may be all remaining characters in the English alphabet except the characters in the first security information, or may be some remaining characters in the English alphabet except the characters in the first security information. Herein, description is continued by using an example in which the first character information is "PATEN", and the first character information may be "BCDFG", or may be all remaining characters in the 26 English characters except "PATEN". A second correspondence between each character in the first character information and a character in the second character information is set, and the second correspondence is also a one-to-one correspondence. It should be noted that, the characters included in the second character information may be characters of the second type, that is, any character between 0 and 9. For example, it may be set that a character B corresponds to a character 4, and a character C corresponds to a character 0.

In this embodiment of the present disclosure, when it is determined that a local terminal is in a first security mode, prestored first security information is acquired; first verification information entered by a user is received, and a first correspondence between the first security information and the first verification information is established; confusion information, the first security information, and the first verification information are displayed on a screen for the user to select; after selection of the user, a selection result of the user is received, and whether the selection result of the user meets a preset rule is determined according to the first correspondence; and when the selection result of the user meets the preset rule, the user is prompted that the terminal is in a second security mode. In this embodiment of the present disclosure, the prestored first security information is not directly output, but the first correspondence between the first security information and the first verification information is established, the confusion information, the first security information, and the first verification information are displayed on the screen for the user to perform verification and selection, and whether the selection result of the user meets the preset rule is determined according to the first correspondence, so as to prompt the user that the terminal is in the second security mode. Therefore, in this manner, the first security information cannot be obtained in another manner such as peeking or image shooting. Therefore, the security mode prompt method is highly secure and practical.

Figure 21:
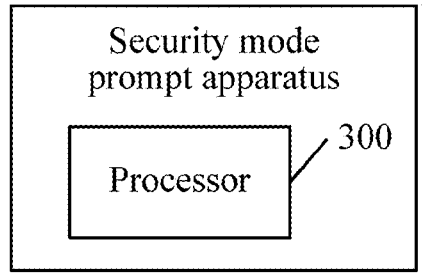
FIG. 21 is a schematic structural diagram of a still further security mode prompt apparatus according to an embodiment of the present disclosure.

FIG. 21 is a schematic structural diagram of a still further security mode prompt apparatus according to an embodiment of the present disclosure. As shown in FIG. 21, the security mode prompt apparatus provided in this embodiment of the present disclosure includes a processor 300.

The processor 300 is configured to: when determining that a terminal is currently in a first security mode, acquire a prestored quantity of times of vibration.

The processor 300 is further configured to perform, according to the quantity of times of vibration, vibration that matches the quantity of times of vibration.

The processor 300 is further configured to: when a confirmation message of a user is received, enter a second security mode.

Optionally, the first security information stored in secure storage is a natural number, and the natural number is a secret quantity, which is stored in the secure storage and is specified by the user when a device is initialized, of times of vibration. The secure storage can be accessed only in a security mode. When it is determined that the terminal is in the first security mode, the prestored quantity of times of vibration is acquired.

Optionally, the terminal reads the prestored quantity of times of vibration from the secure storage, vibration of the local terminal is controlled, and the quantity of times of vibration matches the read number of times of vibration. FIG. 8 is a vibration screen interface when a local terminal vibrates. If the quantity of times of vibration perceived by the user is exactly the natural number prestored in the secure storage, a confirmation message is entered. If the quantity of times of vibration perceived by the user is not the natural number prestored in the secure storage, a confirmation failure message is entered. In this embodiment, a vibration manner enables the user to directly perform perceiving, and displaying is not needed, and therefore, the first security information stored in the secure storage also cannot be obtained in another manner such as peeking or image shooting. The security mode prompt manner has high security.

Optionally, when the terminal receives the confirmation message of the user, the terminal is controlled to enter the second security mode, for example, an interface for entering a password pops up.

In this embodiment of the present disclosure, when it is determined that a terminal is currently in a first security mode, a prestored quantity of times of vibration is acquired; vibration that matches the quantity of times of vibration is performed according to the quantity of times of vibration; and a user performs confirmation according to the quantity of times of vibration, and when a confirmation message of the user is received, the terminal enters a second security mode. In this embodiment of the present disclosure, the prestored quantity of times of vibration is not directly output, but vibration that matches the quantity of times of vibration is performed, so that the user performs confirmation according to the quantity of times of vibration perceived by the user, and when receiving the confirmation message of the user, the terminal enters the second security mode again. Therefore, in this manner, the quantity of times of vibration cannot be obtained in another manner such as peeking or image shooting, and the security mode prompt method is highly secure and practical.

Figure 22:
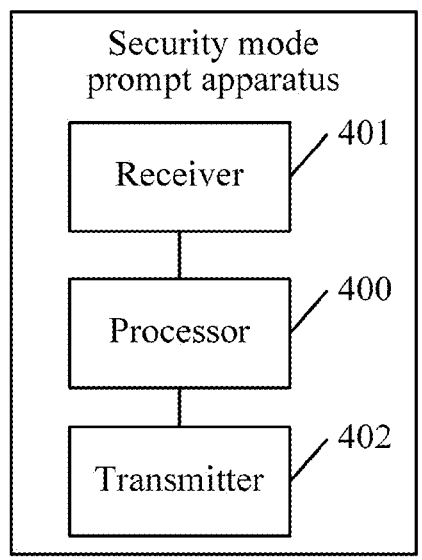
FIG. 22 is a schematic structural diagram of a yet further security mode prompt apparatus according to an embodiment of the present disclosure.

FIG. 22 is a schematic structural diagram of a yet further security mode prompt apparatus according to an embodiment of the present disclosure. As shown in FIG. 22, the security mode prompt apparatus provided in this embodiment of the present disclosure includes a processor 400, a receiver 401, and a transmitter 402.

The processor 400 is configured to when determining that a first apparatus is currently in a first security mode, acquire a prestored private key.

The processor 400 is configured to encrypt preset information according to the private key, to obtain a ciphertext.

The transmitter 402 is configured to send the ciphertext to a second apparatus, so that the second apparatus decrypts the ciphertext according to a public key corresponding to the private key, and sends feedback information according to a decryption result.

The receiver 401 is configured to receive the feedback information sent by the second apparatus.

The processor 400 is configured to when determining according to the feedback information that the decryption succeeds, enter a second security mode.

Optionally, when it is determined that the first apparatus is currently in the first security mode, the prestored private key is acquired. It should be noted that, the first security mode may be that, an indicator in a status bar of the first apparatus is on, and a secret picture is displayed.

Optionally, when the first security information stored in secure storage is the private key, the preset information is acquired, and it is assumed that the preset information is M. A digital signature operation is performed on the preset information by using the private key and a digital signature algorithm, so as to encrypt the preset information, to obtain the ciphertext, and it is assumed that the ciphertext is Sig(M). It should be noted that, when the first apparatus performs presetting, a key/public key pair may be generated, the key is in one-to-one correspondence with the public key, the generated key is stored in the secure storage of the first apparatus, and the public key is sent to the second apparatus. The preset information may be an APP name, a date, a time, a mobile phone identifier name, and the like. A process of performing a digital signature operation on the preset information by the first apparatus by using the private key is verifying whether the private key is a private key in the secure storage.

Optionally, the first apparatus sends the obtained ciphertext to the second apparatus, and the second apparatus decrypts the ciphertext according to the public key corresponding to the private key, and sends the feedback information according to the decryption result. It should be noted that, the feedback information may include whether the second apparatus successfully decrypts the ciphertext.

Further, the second apparatus may be a watch, as shown in FIG. 10. Because less software is installed, and the second apparatus of this type is an auxiliary functional device of a mobile phone in most cases, an intrusion opportunity is low, and it may be assumed that the second apparatus is a trusted apparatus. Further, the mobile phone may send the ciphertext to the watch by using BLUETOOTH or WIFI, and after the watch receives the ciphertext, the ciphertext is decrypted by using the public key corresponding to the private key. A specific decryption process may be that, herein, description is continued by using an example in which the preset information is M and the ciphertext is Sig(M), the watch decrypts the ciphertext by using a verification function such as Verify(M, Sig(M)) and the public key, and if Sig(M) is indeed used for encrypting the preset information M by using the private key in the secure storage, the function outputs a result 1, indicating that the decryption succeeds; otherwise, the function outputs 0, indicating that the decryption fails. Whether the decryption succeeds is encapsulated into feedback information, and the feedback information is sent to the first apparatus, so that the first apparatus is controlled to enter the second security mode. In this embodiment, whether the private key for performing encryption is the private key in the secure storage is verified mainly by using the public key.

Optionally, the first apparatus receives the feedback information sent by the second apparatus, and parses the received feedback information.

Optionally, when it is determined according to the feedback information received by the first apparatus that the decryption succeeds, the first apparatus enters the second security mode, and the second security mode may be a mode in which the user enters a payment password.

Further, when the first apparatus enters the second security mode, the user may be notified in a screen display manner or vibration manner that the local terminal is in the second security mode. The processor is further configured to convert the ciphertext into a two-dimensional code, and display the two-dimensional code on a screen for the second apparatus to scan.

Optionally, in order to send the ciphertext to the second apparatus, the ciphertext may be converted into the two-dimensional code and the two-dimensional code is displayed on the screen, so that the second apparatus having a camera scans the two-dimensional code, to obtain the preset information.

The first apparatus displays, on the screen of the first apparatus, the two-dimensional code obtained by converting, and in order to verify whether a local terminal is currently in the second security mode, the user may scan the two-dimensional code by using the second apparatus having a camera, for example, scan the two-dimensional code by using sun glasses. As shown in FIG. 12, a camera is set on a frame of sun glasses, and when the screen of the first apparatus displays a two-dimensional code, the two-dimensional code is scanned by using the camera.

Further, the second apparatus converts the scanned two-dimensional code into the ciphertext, and decrypts the ciphertext by using the public key corresponding to the private key. A specific decryption process may be that, herein, description is continued by using an example in which original information is M and the ciphertext is Sig(M), the second apparatus, that is, sun glasses, decrypts the ciphertext by using a verification function such as Verify(M, Sig(M)) and the public key, and if Sig(M) is indeed used for encrypting the preset information M by using the private key in the secure storage, the function outputs a result 1, indicating that the decryption succeeds; otherwise, the function outputs 0, indicating that the decryption fails. In this embodiment, whether the private key for performing encryption is the private key in the secure storage is verified mainly by using the public key. Further, the second apparatus may send the feedback information to the first apparatus according to whether the decryption succeeds.

In this embodiment of the present disclosure, when it is determined that a first terminal is currently in a first security mode, a prestored private key is acquired; preset information is encrypted according to the acquired private key, to obtain a ciphertext; the ciphertext is sent to a second terminal, so that the second terminal decrypts the ciphertext according to a public key corresponding to the private key, and sends feedback information according to a decryption result; and when the first terminal receives the feedback information sent by the second terminal, and it is confirmed according to the feedback information that the decryption succeeds, the first terminal enters a second security mode. In this embodiment of the present disclosure, the prestored private key is not directly output, but the preset information is encrypted by using the private key, to obtain the ciphertext, the ciphertext is sent to the second terminal for verification, and when successfully decrypting the ciphertext by using the public key corresponding to the private key, the second terminal enters the second security mode. Therefore, in this manner, the private key cannot be obtained in another manner such as peeking or image shooting, and the security mode prompt method is highly secure and practical.

It should be noted that, for brevity of description, all the foregoing method embodiments are expressed as a series of action combinations. However, a person skilled in the art should know that, the present disclosure is not limited by the described sequence of actions because some steps may be performed in another sequence or simultaneously according to the present disclosure. Second, a person skilled in the art should also know that, all the embodiments described in the specification are exemplary embodiments, and the involved actions and modules are not necessarily required in the present disclosure.

In the foregoing embodiments, the description of each of the embodiments has respective focuses. For a part that is not described in detail in an embodiment, reference may be made to related descriptions in other embodiments.

Sequence adjustment, combination, and deletion may be performed on the steps in the method of the embodiments of the present disclosure according to an actual requirement.

Combination, division, and deletion may be performed on the units in the apparatus of the embodiments of the present disclosure according to an actual requirement. A person skilled in the art may integrate or combine the different embodiments and features of different embodiments that are described in the specification.

With descriptions of the foregoing embodiments, a person skilled in the art may clearly understand that the present disclosure may be implemented by hardware, firmware or a combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following is used as an example but is not limited. The computer readable medium may include a random access memory (RAM), a read-only memory (ROM), an electrically erasable programmable read-only memory (EEPROM), a compact disc read-only memory (CD-ROM) or other optical disk storage, a magnetic disk storage medium or other disk storage, or any other medium that can be used to carry or store expected program code in a command or data structure form and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk and disc used by the present disclosure includes a compact disc (CD), a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In summary, what is described above is merely exemplary embodiments of the technical solutions of the present disclosure, but is not intended to limit the protection scope of the present disclosure. Any modification, equivalent replacement, or improvement made without departing from the spirit and principle of the present disclosure shall fall within the protection scope of the present disclosure.

What is claimed is:

1. A security mode prompt method, wherein the method comprises:
   acquiring prestored first security information when it is determined that a terminal is currently in a first security mode;
   receiving first verification information entered by a user;
   establishing a first correspondence between the first security information and the first verification information;
   displaying confusion information, the first security information, and the first verification information on a screen for the user to select;
   receiving a selection result of the user;
   determining, according to the first correspondence, whether the selection result of the user meets a preset rule; and
   prompting the user that the terminal is in a second security mode when the selection result of the user meets the preset rule.

2. The method according to claim 1, wherein the first security information comprises at least two characters, wherein the first verification information comprises at least two characters, wherein a length of the first security information is equal to a length of the first verification information, and wherein establishing the first correspondence between the first security information and the first verification information comprises:
   establishing a one-to-one correspondence between the characters in the first security information and the characters in the first verification information; and
   setting the one-to-one correspondence as the first correspondence.

3. The method according to claim 1, before displaying the confusion information, the first security information, and the first verification information on the screen for the user to select, the method further comprising acquiring prestored confusion information.

4. The method according to claim 1, before displaying the confusion information, the first security information, and the first verification information on the screen for the user to select, the method further comprising constructing the confusion information according to at least one of the first security information and the first verification information.

5. A security mode prompt apparatus, comprising:
   a first acquiring module configured to acquire prestored first security information when determining that the apparatus is currently in a first security mode;
   a receiving and establishment module configured to:
     receive first verification information entered by a user; and
     establish a first correspondence between the first security information and the first verification information;
   a display module configured to display:
     confusion information;
     the first security information; and
     the first verification information on a screen for the user to select;
   a first receiving module configured to:
     receive a selection result of the user; and
     determine, according to the first correspondence, whether the selection result of the user meets a preset rule; and
   a prompt module configured to prompt the user that the apparatus is in a second security mode when the selection result of the user meets the preset rule.

6. The apparatus according to claim 5, wherein the first security information comprises at least two characters, wherein the first verification information comprises at least two characters, wherein a length of the first security information is equal to a length of the first verification information, and wherein the receiving and establishment module comprises:
   a receiving unit configured to receive the first verification information entered by the user; and
   an establishment unit configured to:
     establish a one-to-one correspondence between the characters in the first security information and the characters in the first verification information; and
     set the one-to-one correspondence as the first correspondence.

7. The apparatus according to claim 5, wherein the apparatus further comprises a second acquiring module, wherein the second acquiring module is configured to acquire prestored confusion information.

8. The apparatus according to claim 5, wherein the apparatus further comprises a construction module, wherein the construction module is configured to construct the confusion information according to the first security information or the first verification information.

* * * * *